(12) United States Patent
Hoffman

(10) Patent No.: US 8,600,885 B2
(45) Date of Patent: Dec. 3, 2013

(54) ACCOUNT CONTRIBUTION MANAGEMENT

(75) Inventor: Paul Joseph Hoffman, Mill Valley, CA (US)

(73) Assignee: Passport Health Communications, Inc., Franklin, TN (US)

( * ) Notice: Subject to any disclaimer, the term of this patent is extended or adjusted under 35 U.S.C. 154(b) by 0 days.

(21) Appl. No.: 13/326,134

(22) Filed: Dec. 14, 2011

(65) Prior Publication Data

US 2012/0259773 A1 Oct. 11, 2012

Related U.S. Application Data

(60) Provisional application No. 61/422,896, filed on Dec. 14, 2010.

(51) Int. Cl.
*G06Q 40/00* (2012.01)

(52) U.S. Cl.
USPC .......................................................... 705/40

(58) Field of Classification Search
CPC ..................................................... G06Q 40/00
USPC .......................................................... 705/40
See application file for complete search history.

(56) References Cited

U.S. PATENT DOCUMENTS

| | | | |
|---|---|---|---|
| 2004/0006495 A1* | 1/2004 | Dudley | 705/3 |
| 2006/0277475 A1* | 12/2006 | Bimson et al. | 715/751 |
| 2007/0043663 A1* | 2/2007 | Simpson | 705/39 |
| 2010/0332404 A1* | 12/2010 | Valin | 705/310 |

* cited by examiner

*Primary Examiner* — Jessica Lemieux
(74) *Attorney, Agent, or Firm* — Merchant & Gould

(57) ABSTRACT

An ability to expose and display a current billing amount associated with a billing account in a billing system to one or more third parties, and to link one or more payments from the one or more third parties to the billing account in an account receivable system is provided. A user may create, publish, and share a fundraising webpage, which when accessed by a third party, allows the third party to send a payment in the form of a contribution or donation. An intermediary system allows for secure communication of billing account data from the accounts receivable system to the third party, allowing the third party to interact with the accounts receivable system as if the third party is in direct communication with the accounts receivable system.

20 Claims, 29 Drawing Sheets

1300

ANNOUNCING A FUNDRAISING WEBSITE FOR JOHN SMITH'S MEDICAL BILLS

FROM: JOHNSMITH@GMAIL.COM

SENT: FRI 10/7/10 7:57 PM

TO: JANESMITH@GMAIL.COM

I CREATED A FUNDRAISING WEBSITE TO HELP ME RAISE MONEY FOR MY MEDICAL BILLS. ANY DONATIONS MADE AT MY FUNDRAISING SITE AUTOMATICALLY GO DIRECT TO THE PASSPORT HOSPITAL AND WILL BE PUT TOWARDS MY OPEN ACCOUNTS WITH THE HOSPITAL. YOU CAN TRACK MY PROGRESS IN PAYING OFF MY MEDICAL BILLS AT THE SITE AND LEAVE A MESSAGE IN MY GUESTBOOK.

VISIT MY FUNDRAISING WEBSITE:

HTTPS://WWW.PASSPORTHOSPITAL.ORG/PATIENTFUNDRAISE/JSMITH — 605

THANK YOU.

JOHN SMITH

300

| HOSPITAL BANNER | | | | | HELP/FAQ<br>CONTACT US<br>GO PAPERLESS |
|---|---|---|---|---|---|
| ACCOUNTS OVERVIEW | PAYMENTS OPTIONS | RESOURCES | MANAGE ACCOUNT | COMMUNITY | PHYSICIANS & FACILITIES |

ENROLLMENT PROCESS-ONLINE BUSINESS OFFICE

STEP 1:

WELCOME TO THE ENROLLMENT PROCESS FOR THE ONLINE BUSINESS OFFICE. PLEASE START THE PROCESS BY FILLING IN YOUR ACCOUNT INFORMATION BELOW. AFTER WE VALIDATE YOUR IDENTITY, YOU WILL BE ASKED TO SELECT A USER NAME AND PASSWORD.

PLEASE FILL IN THE INFORMATION BELOW AND PRESS THE "CONTINUE" BUTTON.

LAST 4 DIGITS OF SSN: [____] — 305

ACCOUNT NUMBER: [____] — 310  (A CURRENT OPEN ACCOUNT FROM YOUR PAPER STATEMENT):

[ CONTINUE ]  [ RESET ]

FIG. 3

ANNOUNCING A FUNDRAISING WEBSITE FOR JOHN SMITH'S MEDICAL BILLS

FROM: JOHNSMITH@GMAIL.COM

SENT: FRI 10/7/10 7:57 PM

TO: JANESMITH@GMAIL.COM

I CREATED A FUNDRAISING WEBSITE TO HELP ME RAISE MONEY FOR MY MEDICAL BILLS. ANY DONATIONS MADE AT MY FUNDRAISING SITE AUTOMATICALLY GO DIRECT TO THE PASSPORT HOSPITAL AND WILL BE PUT TOWARDS MY OPEN ACCOUNTS WITH THE HOSPITAL. YOU CAN TRACK MY PROGRESS IN PAYING OFF MY MEDICAL BILLS AT THE SITE AND LEAVE A MESSAGE IN MY GUESTBOOK.

VISIT MY FUNDRAISING WEBSITE:

HTTPS://WWW.PASSPORTHOSPITAL.ORG/PATIENTFUNDRAISE/JSMITH —605

THANK YOU.

JOHN SMITH

YOUR FUNDRAISING WEBSITE: HTTP://PASSPORTHOSPITAl.ORG/PATIENTFUNDRAISE/JSMITH

FROM: PASSPORTHOSPITAL@PATIENTFUNDRAISE.ORG

SENT: FRI 10/7/10 7:57 PM

TO: JOHNSMITH@GMAIL.COM

CONGRATULATIONS ON SETTING UP YOUR FUNDRAISING WEBSITE FOR YOUR MEDICAL BILLS AT PASSPORT HOSPITAL!

YOUR FUNDRAISING SITE WILL HELP YOU KEEP YOUR FRIENDS AND FAMILY UP TO DATE ON YOUR MEDICAL BILLING ACCOUNTS AND ALLOW THEM TO PROVIDE SUPPORT DURING THESE CHALLENGING TIMES. ALL DONATIONS WILL GO DIRECTLY INTO YOUR BILLING ACCOUNTS AT PASSPORT HOSPITAL AND YOU WILL BE NOTIFIED OF YOUR PROGRESS.

YOUR FUNDRAISING WEBSITE : — 605

WEBSITE ADDRESS: HTTPS://WWW.PASSPORTHOSPITAL.ORG/PATIENTFUNDRAISE/JSMITH

YOUR EMAIL: JOHNSMITH@GMAIL.COM — 620

PASSWORD: *******

YOUR BILLING ACCOUNT AT PASSPORT HOSPITAL YOU LINKED TO YOUR FUNDRAISING SITE:
— 635

ACCOUNT 1234567   PATIENT BALANCE $488.60   PATIENT NAME JOHN SMITH

YOU CAN FORWARD THIS ANNOUNCEMENT TO YOUR FAMILY AND FRIENDS TO BEGIN RAISING DONATIONS FOR YOUR MEDICAL BILLS.

PLEASE CONTACT US WITH ANY QUESTIONS ABOUT USING THE SITE.

ALL THE BEST,

PASSPORT HOSPITAL CUSTOMER SERVICE

THE SMITH FAMILY FUNDRAISER-PASSPORT HEALTH MEDICAL BILLS

| FAMILY PHOTO HERE | FUNDRAISING PROGRESS:<br><br>RAISED: $100  [////////] $388.60 NEEDED TO PAY OFF HOSPITAL BILL — 1910<br><br>GOAL FOR JOHN SMITH PASSPORT HOSPITAL ACCOUNT XXXXX67: $488.60 — 1905<br>ALL DONATIONS WILL AUTOMATICALLY BE APPLIED TO JOHN SMITH'S ACCOUNT XXXXX67<br><br>1915 — [ DONATE NOW ]   ONLINE DONATIONS ARE SECURE 🔒<br><br>HELP SPREAD THE WORD: SHARE THIS FUNDRAISING SITE WITH FRIENDS NOW!<br><br><u>FACEBOOK</u>   <u>TWITTER</u>   <u>EMAIL FRIENDS</u>   <u>SEND WEB ADDRESS</u> — 1930 |

MY PERSONAL STORY  — 630

THANK YOU FOR VISITING MY FUNDRAISING WEBSITE!
THIS FUNDRAISING SITE HAS BEEN CREATED TO HELP PAY OFF MY MEDICAL BILLS AT PASSPORT HOSPITAL.
YOUR HELP IS MUCH APPRECIATED AND DON'T FORGET TO PASS THIS ON TO ANYONE WHO YOU THINK MIGHT DONATE.

RECENT DONATIONS & COMMENTS  — 1920

| NAME | DATE | DONATION AMOUNT | MESSAGE |
|---|---|---|---|
| JOHN DOE | 10-11-10 | $100.00 | GOOD LUCK WITH YOUR PAYING OFF YOUR HOSPITAL BILLS! |

POST YOUR COMMENT:  — 1925

DISPLAY NAME: [            ]

COMMENT: [            ]

[ POST COMMENT ]

FIG. 19

PLEASE ENTER YOUR DONATION BELOW:

ALL DONATIONS WILL BE AUTOMATICALLY APPLIED TO JOHN SMITH'S ACCOUNTS AT PASSPORT HOSPITAL

STEP 1: ENTER YOUR DONATION INFORMATION BELOW FOR JOHN SMITH'S ACCOUNT XXXX67 AT PASSPORT HOSPITAL

DONATION AMOUNT: $ ⎯⎯ PLEASE ENTER YOUR NAME EXACTLY AS IT APPEARS ON YOUR CARD.

YOUR NAME:

YOUR EMAIL ADDRESS: YOU WILL RECEIVE AN EMAIL COPY OF YOUR DONATION RECEIPT.

POST A COMMENT: COMMENTS WILL BE DISPLAYED NEXT TO YOUR DONATION.

KEEP DONATION PRIVATE: ☐ PLEASE KEEP MY DONATION PRIVATE AND DO NOT DISPLAY TO OTHERS.

STEP 2: FINISH YOUR DONATION ON PAYPAL. YOU DO NOT NEED A PAYPAL ACCOUNT TO DONATE.

[ DONATE ]

FIG. 20

HOSPITAL BANNER

JOHN SMITH- ACCOUNT DASHBOARD

| ACCOUNTS OVERVIEW | PAYMENTS OPTIONS | RESOURCES | MANAGE ACCOUNT | COMMUNITY | PHYSICIANS & FACILITIES |

HELP/FAQ
CONTACT US
GO PAPERLESS
LINK TO PHR

ACCOUNT SUMMARY

EMAIL: JOHNSMITH@GMAIL.COM - EDIT

GUARANTOR NAME & NUMBER: JOHN SMITH 1234567

| SERVICE DATE | PATIENT | PROVIDER | I OWE | ALERTS |
|---|---|---|---|---|
| 10/07/10 | JOHN SMITH | PASSPORT HOSPITAL | $388.60 | FUNDRAISE |
| 10/07/10 | JANE SMITH | PASSPORT HOSPITAL | $55,000.00 | FUNDRAISE |
| | | AMOUNT YOU OWE | $55,388.60 | |
| | | MAKE PAYMENT | | |

2110

VIEW ALL

ACCOUNT INSURANCE

| INSURANCE | GROUP/PLAN | ID NUMBER |
|---|---|---|
| BLUE CROSS | 344A7777 | 007000 |

MEMBER DEDUCTIBLE TO DATE: $1,000.00

VIEW ALL                    UPDATE INSURANCE

| HOSPITAL | DOCTOR | INSURANCE EOB |

ACCOUNT DETAILS

GUARANTOR NAME AND NUMBER: JOHN SMITH 1234567

SORT [ ⇩ ]  MESSAGE CENTER (0 UNREAD)

PATIENT: JOHN SMITH  ACCOUNT NUMBER: 1234567  SERVICE DATE: 10-7-10  FACILITY: PASSPORT HEALTH HOSPITAL

QUICK LINKS  CURRENT ACCOUNT ACTIVITY  HOW I OWE AMOUNT ($55,000) CALCULATED

| VIEW ESTIMATES YOU PAID | TOTAL CHARGES - | $1,854.00 | SEE CHARGES | TOTAL CHARGES | $1,854.00 |
| VIEW INSURANCE EOB | INSURANCE PAYMENTS/ADJ- | $1,000.00 | | INSURANCE PAYMENTS | $ 750.00 |
| VIEW PDF OF ACCOUNT | INSURANCE PENDING- | $ 0.00 | | INSURANCE WRITEOFF | $ 250.00 |
| | PATIENT PAYMENTS- | $ 365.40 | SEE ESTIMATE PAID | APPLIED TO DEDUCTIBLE | $ 200.00 |
| VIEW FUNDRAISING TOOLS | FUNDRAISING PAYMENTS | $ 100.00 | VIEW DONATIONS | FUNDRAISING PAYMENTS | $ 100.00 | — 2105
| | CURRENT ACCOUNT BALANCE- | $ 388.60 | | CO-INSURANCE/CO-PAY | $ 185.40 |

PATIENTFUNDRAISE/JSRMITH.COM   2115 — I OWE - $388.60  STATUS-DUE       I OWE-$388.60

PATIENT: JANE SMITH  ACCOUNT NUMBER: 2345678  SERVICE DATE: 10-7-10  FACILITY: PASSPORT HEALTH HOSPITAL

QUICK LINKS  CURRENT ACCOUNT ACTIVITY  HOW I OWE AMOUNT ($55,000) CALCULATED

| VIEW ESTIMATES YOU PAID | TOTAL CHARGES- | $55,000.00 | SEE CHARGES | TOTAL CHARGES | $55,000.00 |
| VIEW INSURANCE EOB | INSURANCE PAYMENTS/ADJ- | $ 0.00 | | INSURANCE PAYMENTS | $ 0.00 |
| VIEW PDF OF ACCOUNT | INSURANCE PENDING- | $ 0.00 | | INSURANCE WRITEOFF | $ 0.00 |
| | PATIENT PAYMENTS- | $ 0.00 | | APPLIED TO DEDUCTIBLE | $ 0.00 |
| VIEW FUNDRAISING TOOLS | FUNDRAISING PAYMENTS | $ 0.00 | VIEW DONATIONS | FUNDRAISING PAYMENTS | $ 0.00 | — 2105
| | CURRENT ACCOUNT BALANCE-$55,000.00 | | | CO-INSURANCE/CO-PAY | $ 0.00 |

PATIENTFUNDRAISE/JSRMITH.COM    I OWE - $55,000.00  STATUS-DUE          I OWE-$55,000.00

MAKE PAYMENT                VIEW PAYMENT OPTIONS

EDIT YOUR FUNDRAISING PAGE HERE

| THE SMITH FAMILY FUNDRAISER-PASSPORT HEALTH MEDICAL BILLS | CHANGE THIS TITLE |

FAMILY PHOTO HERE

FUNDRAISING PROGRESS:
RAISED: $100     ////// $388.60 NEEDED TO PAY OFF HOSPITAL BILL

GOAL FOR JOHN SMITH PASSPORT HOSPITAL ACCOUNT XXXXX67: $488.60
ALL DONATIONS WILL AUTOMATICALLY BE APPLIED TO JOHN SMITH'S ACCOUNT XXXXX67

2210     | DONATE NOW |   ONLINE DONATIONS ARE SECURE 🔒

HELP SPREAD THE WORD: SHARE THIS FUNDRAISING SITE WITH FRIENDS NOW!
FACEBOOK    TWITTER    EMAIL FRIENDS    SEND WEB ADDRESS

CHANGE THIS IMAGE

2215

MY PERSONAL STORY     CHANGE THIS TEXT

THANK YOU FOR VISITING MY FUNDRAISING WEBSITE!
THIS FUNDRAISING SITE HAS BEEN CREATED TO HELP PAY OFF MY MEDICAL BILLS AT PASSPORT HOSPITAL.
YOUR HELP IS MUCH APPRECIATED AND DON'T FORGET TO PASS THIS ON TO ANYONE WHO YOU THINK MIGHT DONATE.

RECENT DONATIONS & COMMENTS

CHECK ANY COLUMNS THAT YOU DO NOT WANT YOUR FRIENDS AND FAMILY TO SEE

NAME ☐    DATE ☐    DONATION AMOUNT ☐    MESSAGE ☐

2220

| SAVE AND CONTINUE |

THE SMITH FAMILY FUNDRAISER-PASSPORT HOSPITAL MEDICAL BILLS

REVIEW YOUR DONATIONS FROM FRIENDS AND FAMILY BELOW

SUMMARY

AMOUNT YOU'VE RAISED FOR PASSPORT ACCOUNT-JOHN SMITH XXXXX67          $100.00

AMOUNT REMAINING TO YOU PAY OFF ACCOUNT                               $388.60

| RECENT DONATIONS AND COMMENTS | | | |
|---|---|---|---|
| NAME | DATE | DONATION AMOUNT | MESSAGE |
| JOHN DOE | 10-11-10 | $100.00 | GOOD LUCK WITH YOU PAYING OFF YOUR HOSPITAL BILLS |

IDEAS TO HELP WITH FUNDRAISING EFFORTS

PASSPORT HOSPITAL OFFERS YOU THE ABILITY TO CONNECT WITH YOUR FRIENDS AND FAMILY ON FACEBOOK, TWITTER, AND YOUR EMAIL LIST.

NEW FUNDRAISING WIDGET!

HAVE YOU ASKED YOUR COMPANY TO MATCH YOUR FUNDRAISING EFFORTS? YOU CAN NOW HAVE YOUR COMPANY LIST YOUR FUNDRAISING CAMPAIGN FOR YOUR MEDICAL BILLS ON THEIR WEBSITE WITH OUR ONLINE DONATION WIDGETS. CLICK THE "NEW FUNDRAISING WIDGET" TAB IN YOUR "MANAGE ACCOUNT" SECTION AND ALLOW YOUR COMPANY TO PUT THE EMBEDDED CODE ONTO THEIR WEBSITE TO PROMOTE YOUR FUND WITH FELLOW EMPLOYEES.

THE JOHN SMITH FUNDRAISER FOR PASSPORT HOSPITAL MEDICAL BILLS

MANAGE YOUR PASSPORT HOSPITALS ON YOUR FUNDRAISING PAGE

635

MANAGE YOUR PASSPORT HOSPITAL BILLING ACCOUNTS: ADD OR REMOVE ACCOUNTS ON YOUR FUNDRAISING PAGE

☐ JOHN SMITH ACCOUNT 1234567   ORIGINAL PATIENT BALANCE-$488.60   FUNDS RAISED-$100.00   CURRENT BALANCE-$388.60   REMOVE ACCOUNT

☐ JANE SMITH ACCOUNT 2345678   ORIGINAL PATIENT BALANCE-$55,000.00   FUNDS RAISED-$00.0   CURRENT BALANCE-$55,000.00   ADD ACCOUNT

NEW!☐ JOHN SMITH ACCOUNT 3456789   ORIGINAL PATIENT BALANCE-$1,575.00   FUNDS RAISED-$0.00   CURRENT BALANCE-$1,575.00   ADD ACCOUNT

CHANGE YOUR PASSPORT HOSPITAL EMAIL: JOHNSMITH@GMAIL.COM

VIEW YOUR PASSPORT HOSPITAL BILLING ACCOUNTS REMOVED FROM YOUR FUNDRAISING PAGE:

JOHN SMITH ACCOUNT 4567890   ORIGINAL PATIENT BALANCE-$1,200.00   FUNDS RAISED-$1,200.00   CURRENT BALANCE-$0.00   ACCOUNT CLOSED

SAVE AND CONTINUE

FIG. 24

ACCOUNT CONTRIBUTION MANAGEMENT

CROSS REFERENCE TO RELATED APPLICATIONS

The present application claims priority to U.S. Provisional Patent Application No. 61/422,896 filed Dec. 14, 2010, the disclosure of which is hereby incorporated by reference in its entirety.

BACKGROUND

In many situations, a person, family, or institution may have a significant financial burden owing to a required or needed expenditure that exceeds their ability to pay. For example, the costs of a required or needed medical procedure, funeral expenses, college tuition or charitable costs may overburden or even threaten the solvency of a given person, family or institution.

In such situations, people, their families, and various institutions often need assistance paying various costs and expenses; however, the administrative difficulties or social obstacles associated with getting funds from a willing donor to the source of the costs (e.g., healthcare provider, college or university, or charity, etc.) often prevent willing donors from being able to help. For example, a caring person may wish to pay all or part of the funeral expenses of a neighbor, but fails to do so for lack of an efficient and/or confidential way of paying the expenses.

In the particular case of medical care, costs can be a significant financial burden on a patient and his/her family. Medical bills can drain a person's budget, his/her savings, and may lead to the person facing legal action or refusal of some physician services if the person is unable to pay the bills. While insurance and various assistance programs may ease some of the burden, many people may have to rely on financial support of friends and/or relatives. Currently, there is not a method in the marketplace for a hospital to receive a payment from a person other than a patient or the person(s) responsible for the patient's medical bills (i.e., guarantor).

Accordingly, there is a need for methods, systems, and computer readable media that allow a person or institution to communicate a need for assistance with bills associated with various types of expenses, and to allow for contributions to be applied directly to the owed accounts associated with a billing system accounts receivable system or department. It is with respect to these and other considerations that the present invention has been made.

SUMMARY

The above and other problems are solved by providing an ability to expose and display current billing amounts associated with one or more owed costs or expenses associated with an accounts receivable system to one or more third parties and to link one of more payments from the one or more third parties to the accounts receivable system. More particularly, aspects of the present invention provide for allowing a user or guarantor of a user's owed costs or expenses (e.g., medical, college, funeral, charity, etc.) to connect billing data from an accounts receivable system of a person or institution to which the costs or expenses are owed, to a fundraising webpage for allowing third parties, for example, the user's family and/or friends, to send payments in the form of a contribution/donation directly to the accounts receivable system associated with the costs or expenses.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF DRAWINGS

FIG. 3 is an illustration of a computer screen display showing an enrollment screen.

FIG. 13 is an illustration of a computer screen display showing an example email that may be automatically sent to a user's email contacts list.

FIG. 18 is an illustration of a computer screen display showing an example email that a user may receive after successfully setting up his/her fundraising webpage.

FIG. 19 is an illustration of a computer screen display showing an example of a graphical user interface screen for displaying a user's fundraising webpage that he/she created and linked to his/her billing account(s).

FIG. 20 is an illustration of a computer screen display showing an example of a graphical user interface screen for entering a donation amount which will be sent electronically to an account receivable associated with a user's billing account(s).

FIGS. 21A and 21B are an illustration of a computer screen display showing an example of a graphical user interface screen for displaying an account dashboard of an online business office after a user has created his/her fundraising webpage.

FIG. 22 is an illustration of a computer screen display showing an example of a graphical user interface screen for allowing a user to edit his/her fundraising webpage.

FIG. 23 is an illustration of a computer screen display showing an example of a graphical user interface screen for allowing a user to review donations and comments that have been posted to his/her fundraising webpage.

FIG. 24 is an illustration of a computer screen display showing an example of a graphical user interface screen for allowing a user to manage billing account(s) that are linked to his/her fundraising webpage.

DETAILED DESCRIPTION

Figure 1:
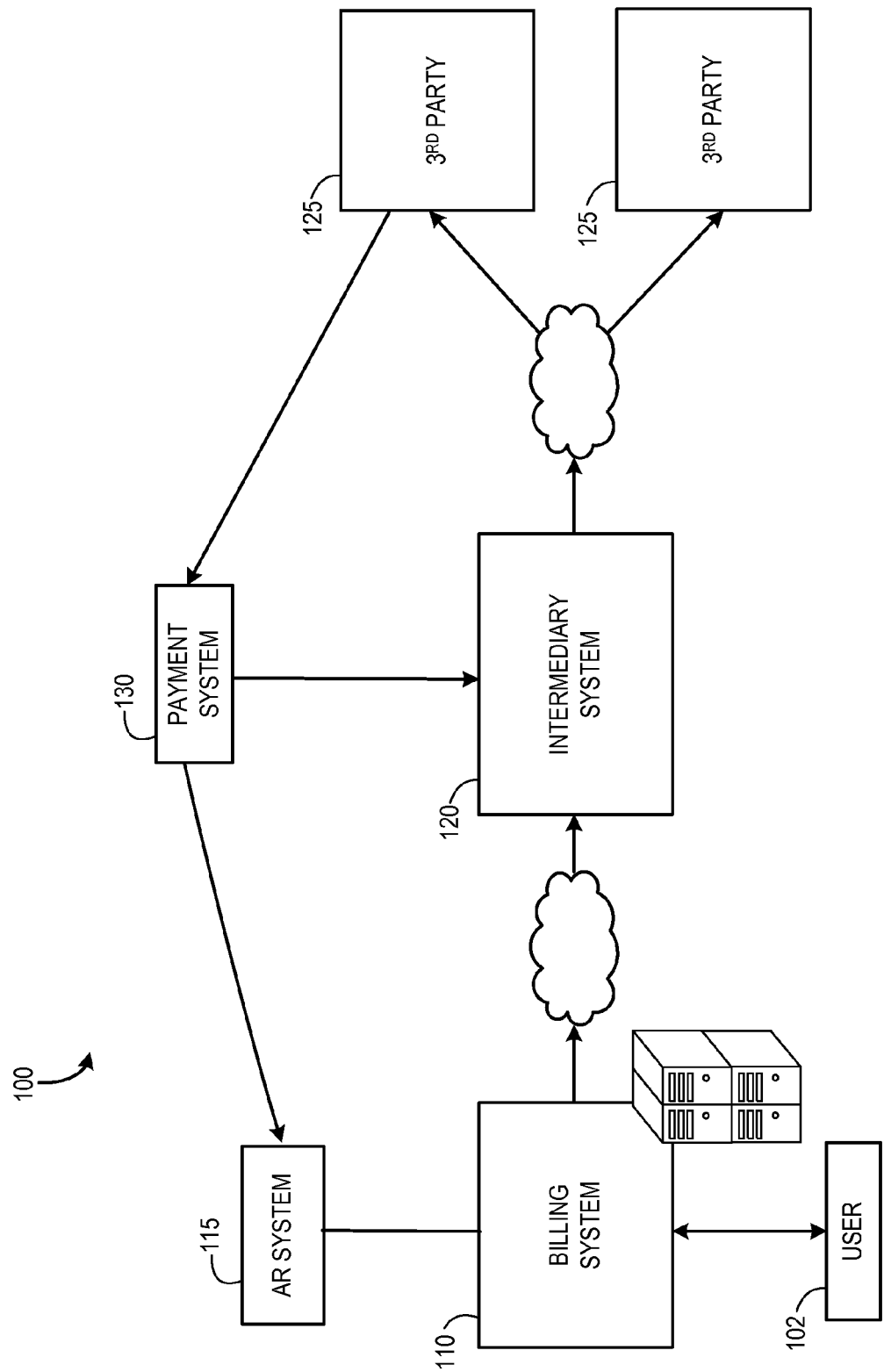
FIG. 1 is a simplified block diagram of a high-level system architecture with which embodiments of the invention may be implemented.

As briefly described above, embodiments of the present invention provide an ability to display billing information associated with an owed account in an accounts receivable system to one or more third parties, and to link one or more payments from the one or more third parties to the accounts receivable system. As will be described in detail below, a user may enroll in an online business office of a billing system, wherein the user may request to participate in a fundraiser, and upon approval, may create a fundraising webpage linked to one or more owed billing accounts for sharing with the user's contacts. The user's fundraising webpage may be shared via email, through social networks, via other websites, and the like. One or more third party contributors/donors may make a donation to one or more billing accounts, which may be sent electronically to the accounts receivable system.

Although embodiments of the present invention are described below with particular reference to a hospital or healthcare provider accounts receivable system, embodiments may be implemented in any billing system wherein account information may be exposed to a third party through an intermediary system, and contributions/donations may be made by a third party and sent directly to an accounts receivable system associated with the account. For example, a billing system may include, but is not limited to, a patient's hospital account, a college student's student account at a college or university, a funeral expenses account at a funeral home, a borrower's mortgage account at a lender, etc.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

Referring now to FIG. 1, a simplified block diagram of a high-level system architecture with which embodiments of the invention may be implemented is shown. The system 100 may include a billing system 110. As described above, the billing system 110 may be a billing system associated with various businesses or organizations including, but not limited to, a healthcare provider, a college, university, or other educational system, a funeral home, a lender, etc. The billing system 110 may be utilized for customer billing, collections, remittance posting, charge entry, claims generation, and reporting. The billing system 110 may comprise an accounts receivable system 115 operable to generate a variety of reports, and to allow an application and tracking of receivables and collections. According to embodiments, the accounts receivable system 115 may receive funds in satisfaction of an owed account.

According to embodiments of the present invention, the system 100 may also include an intermediary system 120 operable to receive billing data from a billing system's accounts receivable system 115 to provide billing data to a customer or guarantor 102, and to provide a web-based page for allowing the customer or guarantor to share billing data with one or more third parties 125. The intermediary system 120 is illustrative of a business or other entity that may include a collection of computers, storage media, or other computing devices operative to generate and display graphical user interface screens, like the graphical user interface screens illustrated in FIGS. 3-25 and therefore for creating and setting up data transport between a third party 125 and an accounts receivable system 115 for allowing the third party contributor/donor to interact with the accounts receivable system through the intermediary system as if the third party is in direct communication with the accounts receivable system. That is, the intermediary system 120 allows for secure communication of accounts receivable data from the accounts receivable system to the third party contributor/donor 125 without exposing the accounts receivable system 115 to security and privacy risks that may be associated with allowing a third party to have unfettered access to a billing system. On the other hand, the intermediary system 120 through publication of the various displays illustrated in FIGS. 3-25 allows the third party contributor/donor 125 to have an efficient user experience with the look and feel of actually being connected to the accounts receivable system 115. The system 100 may include one or more third parties 125 operable to receive billing data and to send payments to an owed billing account in an accounts receivable system 115.

The system 100 may include an electronic payment system 130 (e.g., PAYPAL, GOOGLE PAYMENTS, etc.) operable to allow payments and money transfers to be made through a distributed computing network (e.g., Internet). According to one embodiment, a payment made by a third party 125 through a payment system 130 may be allocated directly to an owed account in an accounts receivable system 115. Alternatively, according to another embodiment, a payment made by a third party 125 through a payment system 130 may be allocated to an owed account in an accounts receivable system 115 via the intermediary system 120.

In FIG. 1, the billing system 110, the intermediary system 120, and the payment system 130 are illustrated as separate systems. As should be appreciated, although illustrated as separate systems, the billing system 110, the intermediary system 120, and the payment system 130 are not limited to such an architecture, and may be implemented in various configurations. For example, the billing system 110, the intermediary system 120, and the payment system 130 may be implemented in a unified system. Alternatively, the billing system 110 and intermediary system 120 may be implemented in a unified system, and the payment system 130 may exist as a separate system.

As described briefly above, billing data associated with an owed account in an accounts receivable system 115 may be presented to a customer or guarantor 102 of the account via an intermediary system 120. According to embodiments, the intermediary system 120 may provide a web-based mechanism for allowing a customer or guarantor access to portions of the customer's billing records, for allowing the customer or guarantor to share billing data with one or more third parties 125, and for allocating a payment made through a payment system 130 to an owed billing account.

Figure 2:
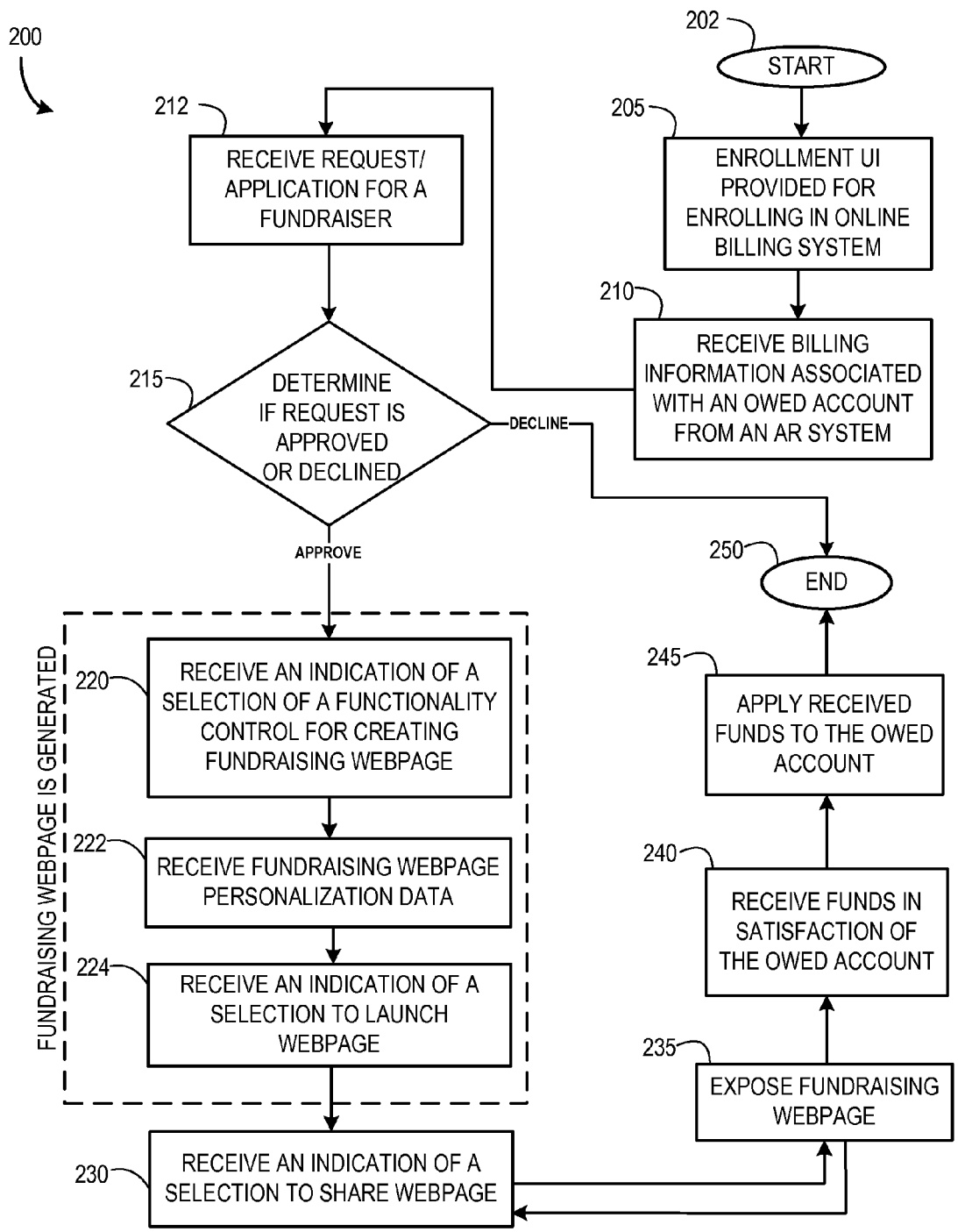
FIG. 2 is a process flow diagram illustrating a routine for exposing an accounts receivable account to a third party to allow the third party to interact with the accounts receivable system.

FIG. 2 is a flow diagram of an illustrative routine 200 for exposing portions of a customer's billing data associated with an owed account in an accounts receivable system 115 to one or more third parties 125 and linking one or more payments from the one or more third parties to an accounts receivable system 115. The routine 200 will be described with reference to FIGS. 3-25, which are illustrative of example screen displays that may be used in association with each of the operational steps of the process flow. References to the example graphical user interface screens illustrated in FIGS. 3-25 may be made in the description of each of the operational steps. The various screen displays illustrated in FIGS. 3-25 are illustrated in the context of medical accounts processing, but similar screens may be generated and used with respect to other account types such as college tuition accounts, funeral expense accounts, charity accounts, etc.

Referring now to FIG. 2, the routine 200 begins at OPERATION 202 and proceeds to OPERATION 205 where a user interface is provided for allowing a user 102 to enroll in an online billing system 110 associated with a business or organization with which the user has a billing account. As an example, the user may be a patient of a health care provider (or a guarantor of the patient), and may have a medical billing account with the health care provider. The user may access the health care provider's website, and may start an enrollment process. According to embodiments, by enrolling in an online billing system 110, a user 102 may be able to access his/her billing account, pay his/her bill, access helpful content, and set up a fundraising webpage.

An example of an enrollment user interface screen 300 is shown in FIG. 3. As shown in FIG. 3, one or more fields 305,310 may be provided in the graphical user interface to collect user data. For example, and as shown in FIG. 3, a user 102 may be prompted to enter data that may validate the user's identity, such data as a social security number 305 and/or an account number 310. Entered data may be verified against the business or organization's accounts receivable database 115 of the user to confirm that the user 102 has a billing account with the business or organization.

Figure 4:
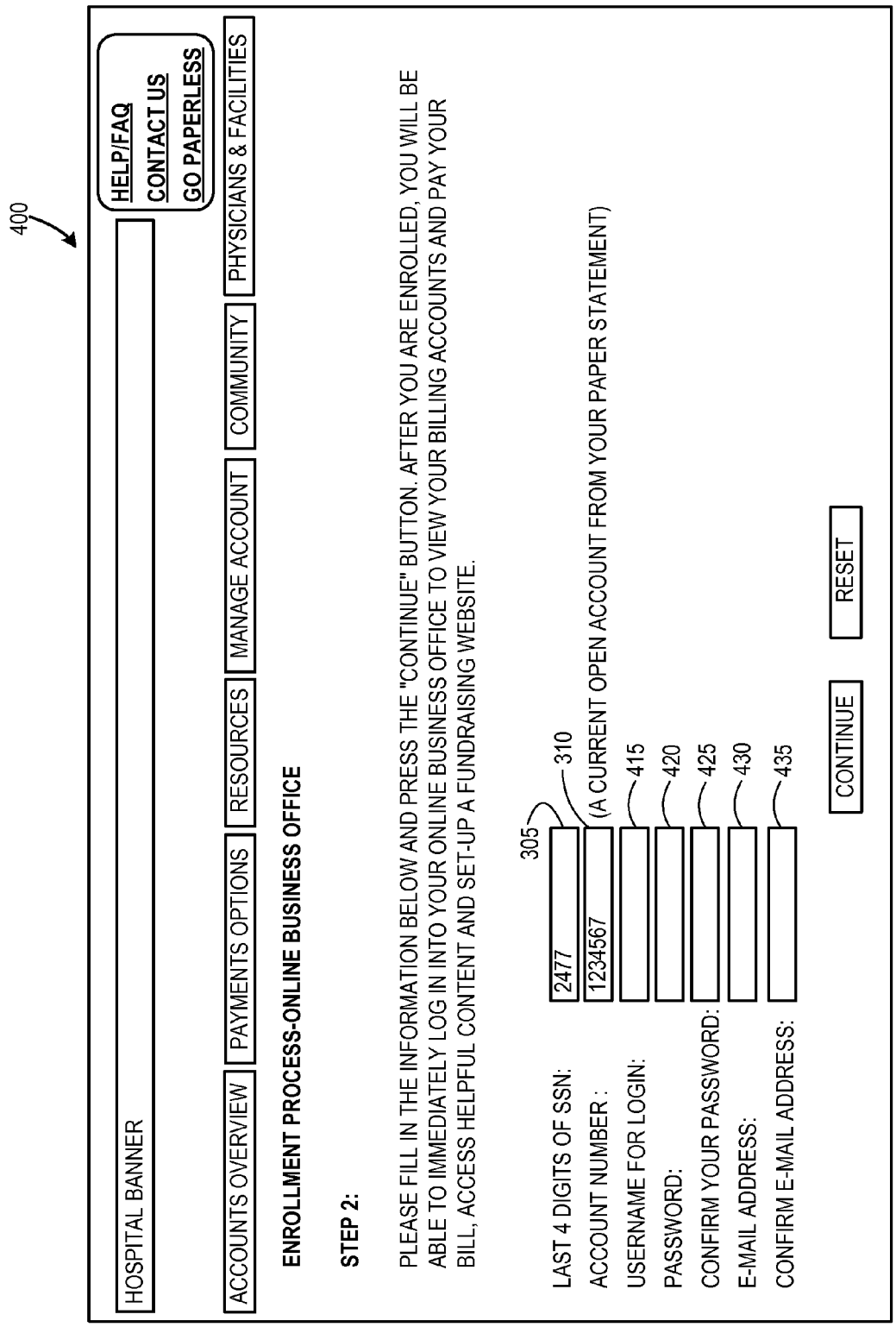
FIG. 4 is an illustration of a computer screen display showing a portion of an enrollment process.

FIG. 4 shows an example user interface screen 400 in which a user 102 may enter additional enrollment process data. For example, and as shown in FIG. 4, fields may be provided for entering a username 415, a password 420, a password confirmation 425, an email address 430, and an email address confirmation 435. According to embodiments, an enrollment process may also include providing an option for the user to select paperless billing.

Figure 5A:
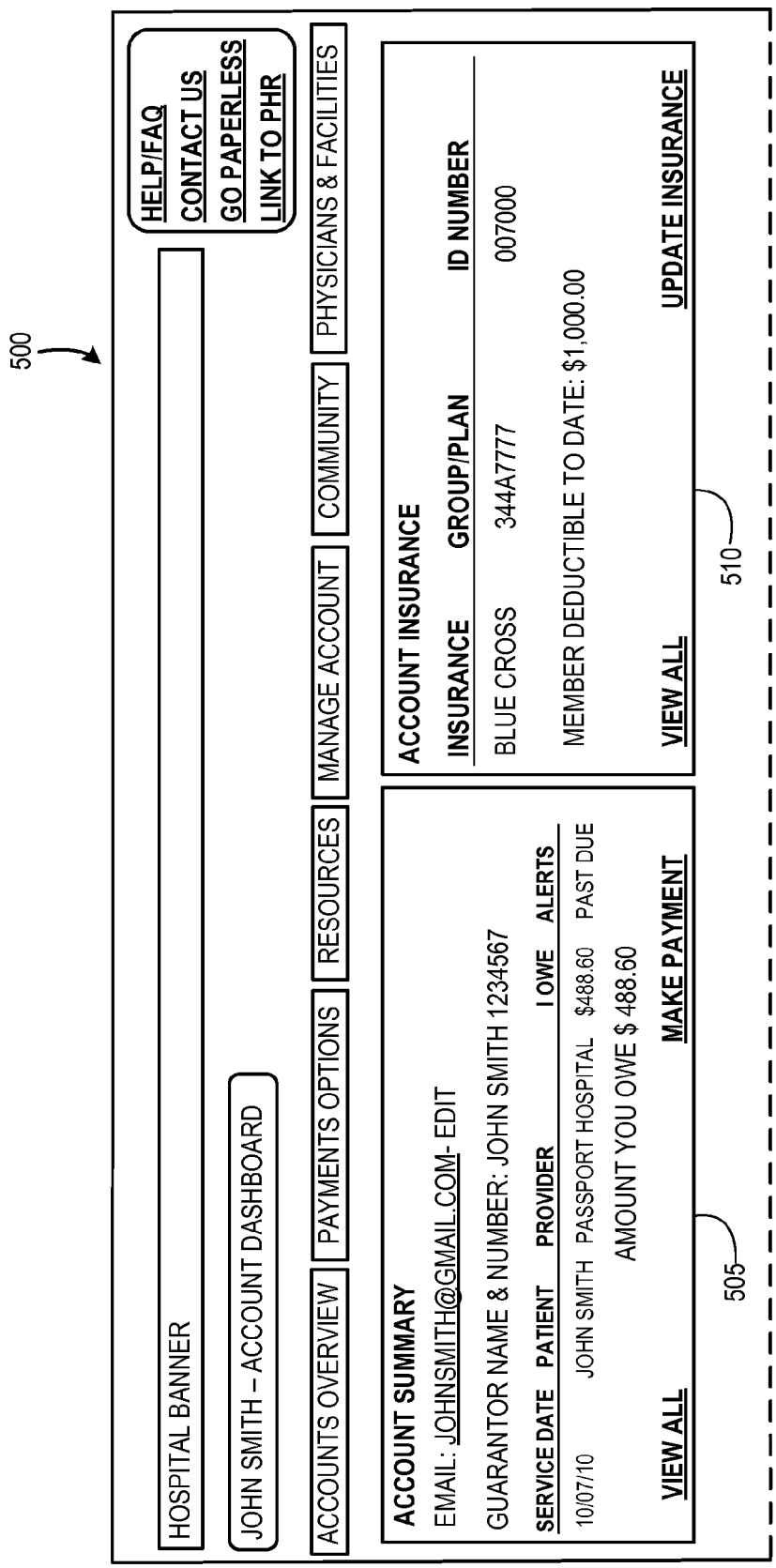
FIGS. 5A and 5B are an illustration of a computer screen display showing an account dashboard screen for displaying a user's billing account(s).
Figure 5B:

Referring back to FIG. 2, after enrolling with an online billing system, the routine 200 proceeds to OPERATION 210, where the user's billing account(s) data may be displayed to the user 102. That is, the user may be able to view billing data associated with his/her billing account(s). An example user interface screen displaying a user's billing account data (e.g., an account dashboard) is shown in FIGS. 5A and 5B. The example account dashboard 500 in FIGS. 5A and 5B shows data associated with a user's medical billing account. The account dashboard 500 may include such data as, but is not limited to, an account summary 505 showing an email address associated with each billing account, a guarantor of each billing account, each account number, and service or purchase information. The dashboard 500 may also show insurance information 510 if applicable, and account details 515 showing account activity, receipts and adjustments. According to an embodiment, the account dashboard 500 may comprise a selectable functionality control 520 for creating a fundraising webpage for allowing one or more third parties 125 to contribute funds towards one or more billing accounts of the user 102. According to another embodiment, the account dashboard 500 may comprise a selectable functionality control for requesting a fundraiser. In this embodiment, the business or organization with which the user has a billing account may require users to apply for a fundraiser (212) and to be approved before allowing users to create a fundraising webpage. As can be appreciated, approval may be based on various circumstances and may vary according to a specific business or organization.

Figure 6A:
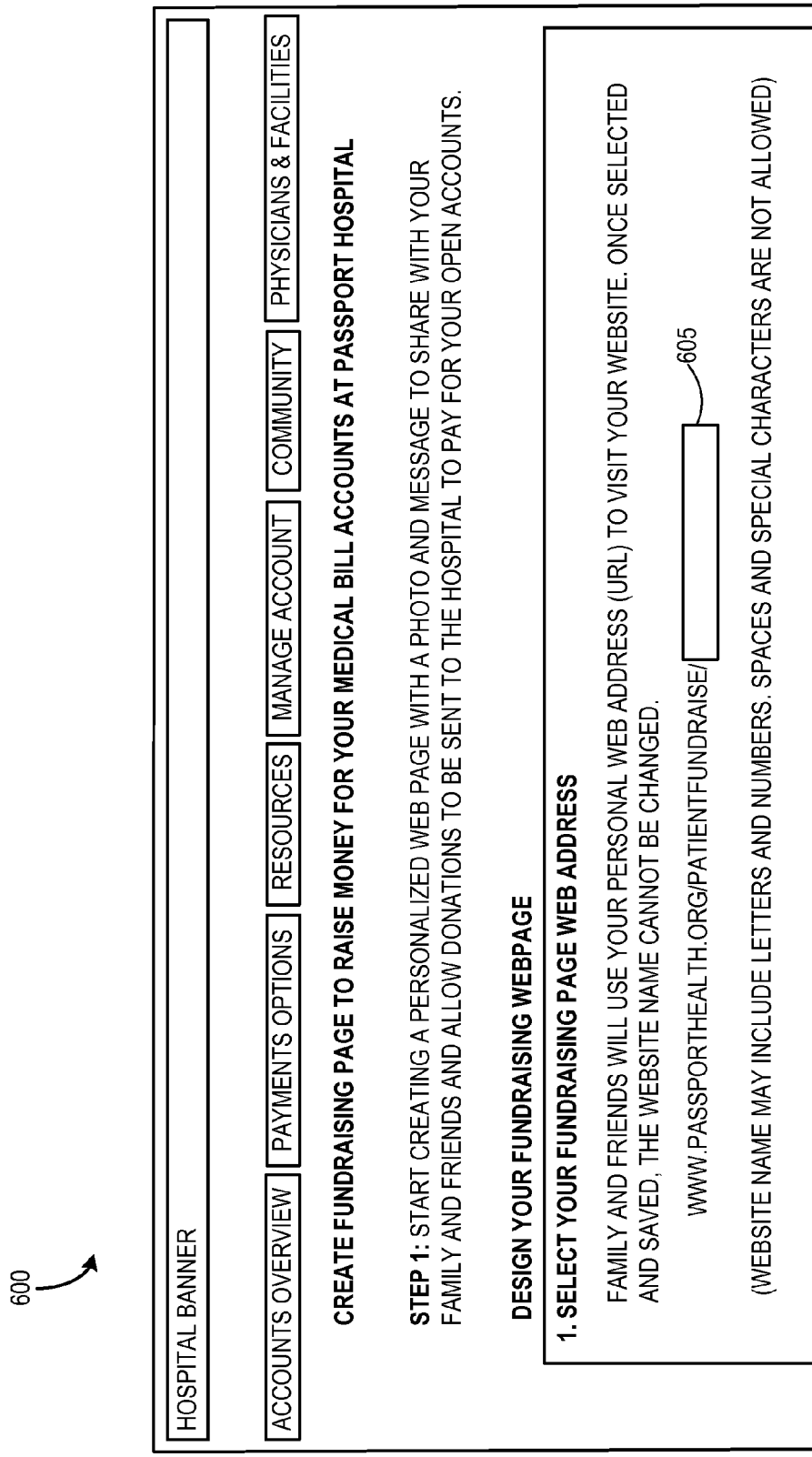
FIGS. 6A and 6B are an illustration of a computer screen display showing an example illustration of a graphical user interface screen containing a list of user data needed to create a personal fundraising webpage that is linked to his/her billing account(s).
Figure 6B:
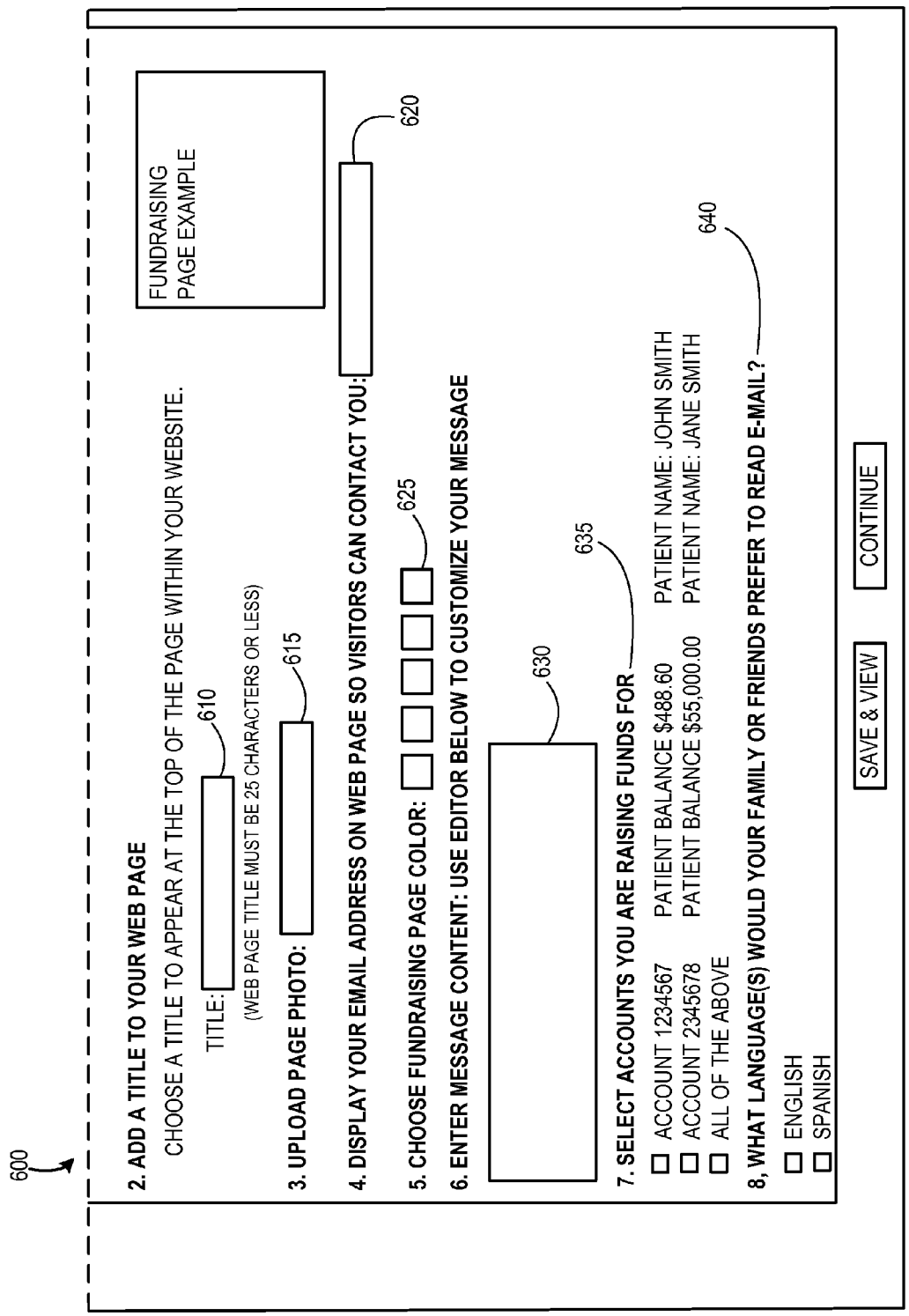

Referring back to FIG. 2, the routine 200 proceeds to OPERATION 212 where a request for a fundraiser is received. At DECISION OPERATION 215, the business or organization with which the user has a billing account may make a determination whether to approve or decline the user's 120 application/request. If the user's request is declined, the routine may end at OPERATION 250. If the user's request is approved, the routine 200 proceeds to OPERATION 220, where the selectable functionality control 520 for creating a fundraising webpage for allowing one or more third parties 125 to contribute funds towards one or more owed billing accounts of the user 102 is selected to create a webpage. Upon a selection to create a fundraising webpage, the routine 200 proceeds to OPERATION 222, where the user 102 may be provided with a user interface for creating and personalizing his/her fundraising webpage. FIGS. 6A and 6B shows an example user interface screen 600 for allowing a user 102 to create and personalize a fundraising webpage. The user interface 600 may include various fields and options for allowing a user to enter personalization data such as, but not limited to, a field for allowing the user to select a web address 605 for his/her fundraising webpage, a field for allowing a user to add a title 610 to the fundraising webpage, a field for allowing the user to upload a photo 615 to be displayed on the webpage, a field for allowing the user to enter an email address 620 which may be displayed on the webpage for allowing one or more third parties 125 to contact him/her, a selectable option to allow the user to apply a style or color template 625 to the webpage, a field for allowing the user to enter a message 630 to be displayed to one or more third parties, a listing of one or more owed billing accounts 635 which the user may select to include on the fundraising webpage and to which donations may be applied, and a language preference 640 option for allowing the user to select a language to use on the fundraising webpage.

Referring again to FIG. 2, the routine 200 proceeds to OPERATION 224, where an indication of a selection to launch the webpage is received. That is, the user 102 may select a functionality control to publish the webpage. According to embodiments, the content on a fundraising webpage may be reviewed before being published. That is, an organization or business with which a user has a billing account may require a full or partial editorial review of fundraising web pages that a user 102 creates. The organization or business may require that content of a fundraising web page be approved before it is published and available on the Internet.

According to an embodiment, a configuration tool may be provided for allowing the organization or business to turn on/off certain features of a fundraising webpage. The configuration tool may be utilized by an organization or business to approve a user's updates to his/her fundraising webpage title and story content, choose whether to allow users and/or donors to add comments on social networking sites (e.g., FACEBOOK), choose whether to allow donors to make donations comments when making a donation, choose whether to allow a user to post updates/videos to his/her fundraising webpage, or to choose whether to allow a user or donor to use links to connect a fundraising webpage to social networking sites.

If a fundraising webpage is reviewed and approved, the user 102 may receive an email or other notification indicating such. The fundraising webpage may then be published. Once the page is published, the user 102 may wish to share the fundraising webpage with one or more third parties 125. Embodiments of the present invention provide for sharing a fundraising webpage via one or more networking methods including, but not limited to, by emailing a link to the fundraising webpage to one or more third parties 125, by posting a link to the fundraising webpage on a social networking site (e.g., FACEBOOK, TWITTER, etc.) or by posting a link to any other web sites to which the user may have permission to post information.

Figure 7:
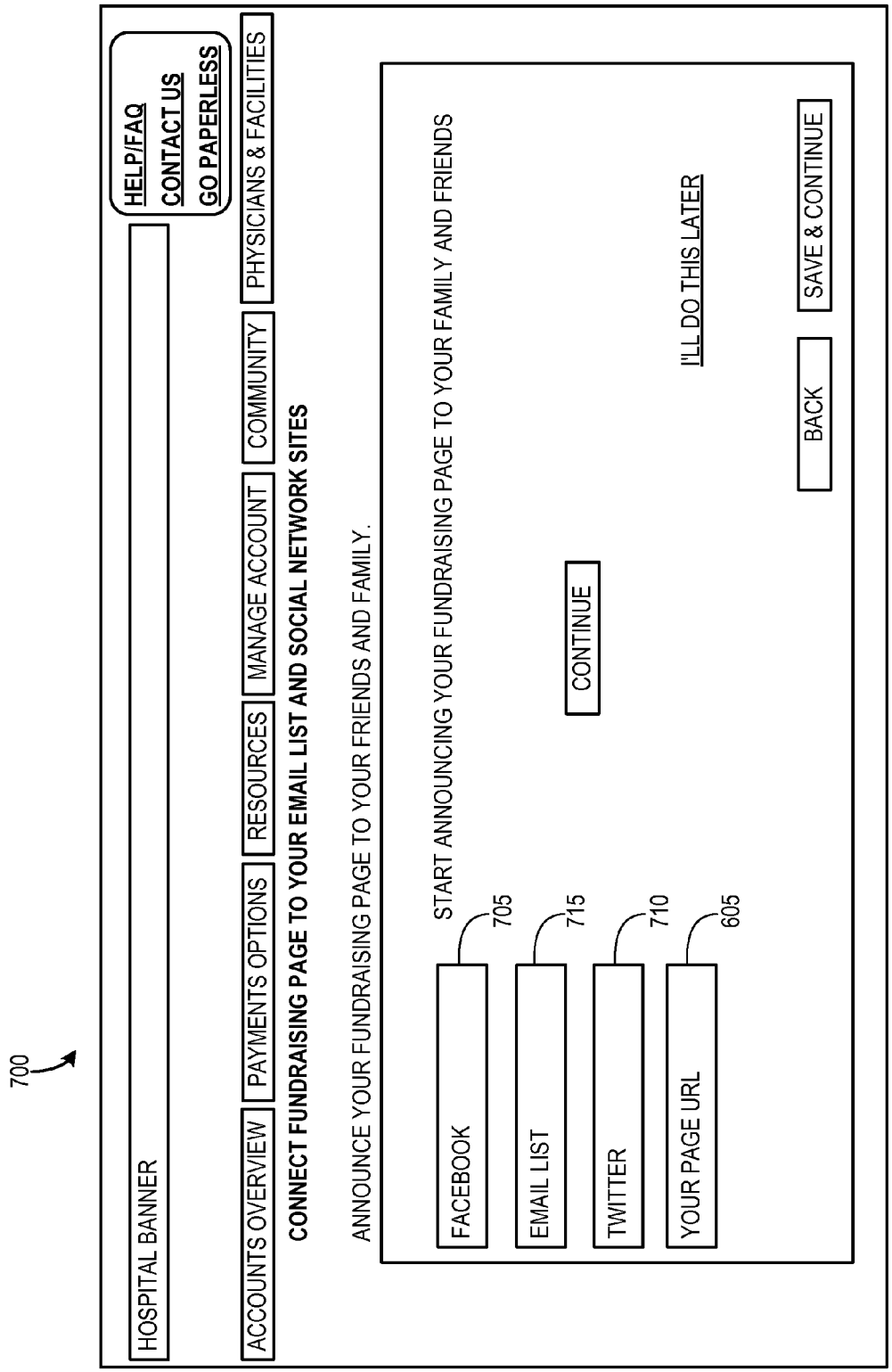
FIG. 7 is an illustration of a computer screen display showing an example of a screen for allowing a user to connect to his/her social network website(s) and electronic mail (email) list.
Figure 8:
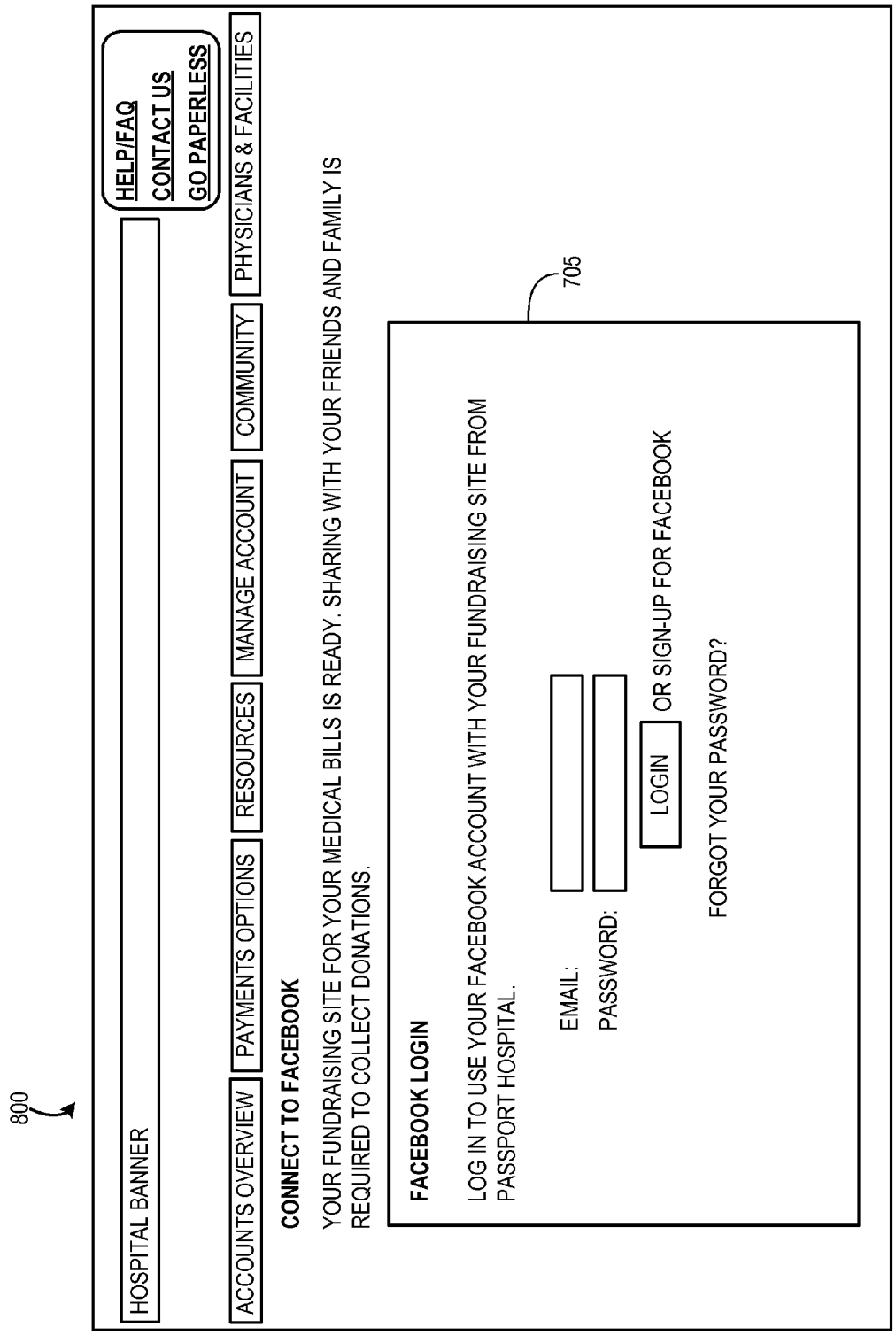
FIG. 8 is an illustration of a computer screen display showing an example of a FACEBOOK login page.
Figure 9:
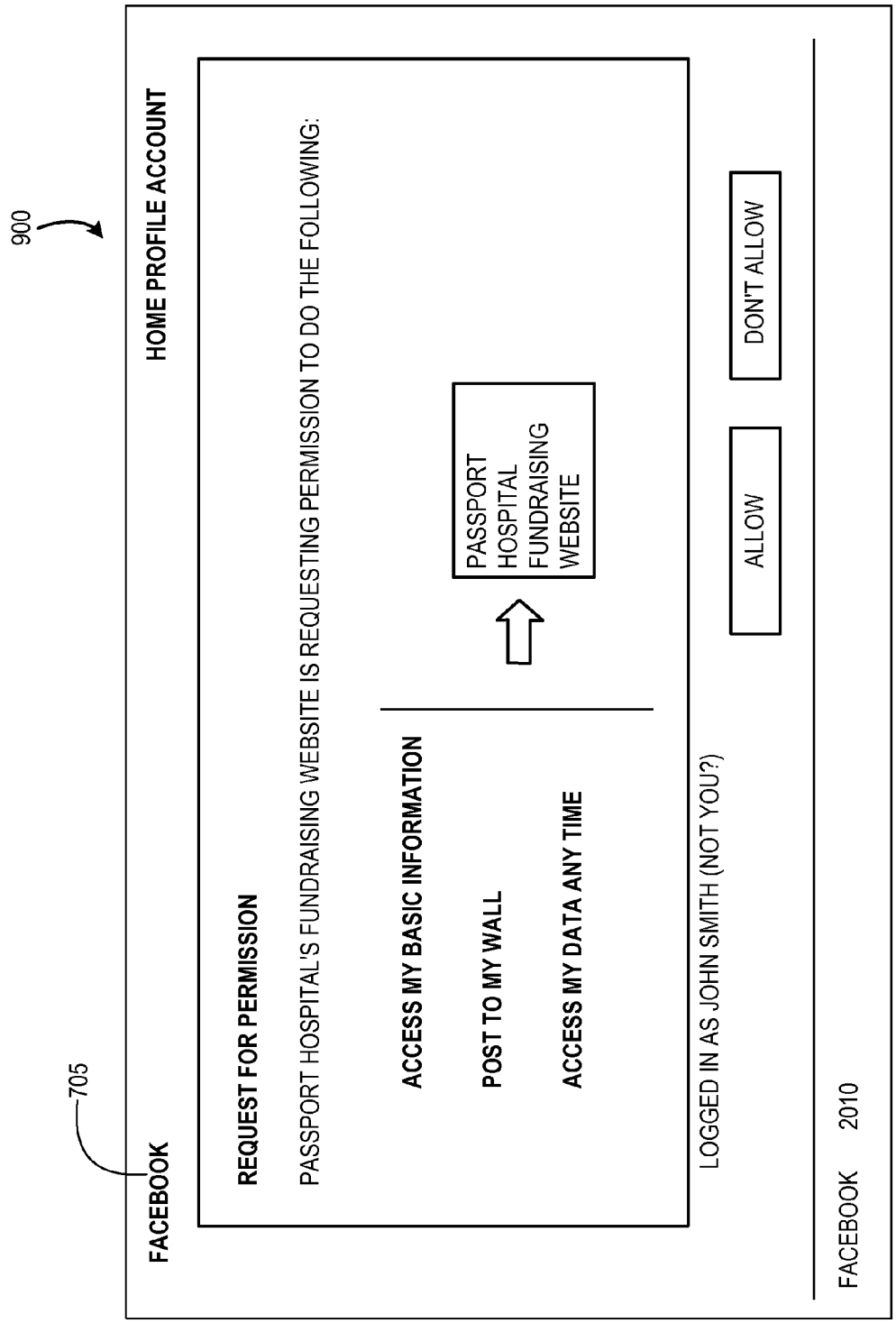
FIG. 9 is an illustration of a computer screen display showing an example of a FACEBOOK request for permission login page.

At OPERATION 230, an indication of a selection to share the fundraising webpage is received. According to embodiments and as shown in FIG. 7, a user interface 700 may be provided for allowing a user 102 to select social networking websites 705,710 with which to share his/her fundraising webpage via posting a link to the webpage. The interface 700 may also provide a selection for allowing the user to select one or more email accounts 715 from which to import contacts to create a fundraising webpage distribution list. Embodiments may provide for an email template, which the user may copy and paste into an email to share with one or more third parties 125. As shown in FIG. 8, a log in page 800 may be provided for allowing a user to log into his/her social networking site 705. In this example log in page 800, the user has selected to log into his/her FACEBOOK account 705. As shown in FIG. 9, a "Request for Permission" log in page 900 may be provided for allowing the user to permit his/her fundraising webpage to be linked to his/her social networking page 705.

Figure 10:
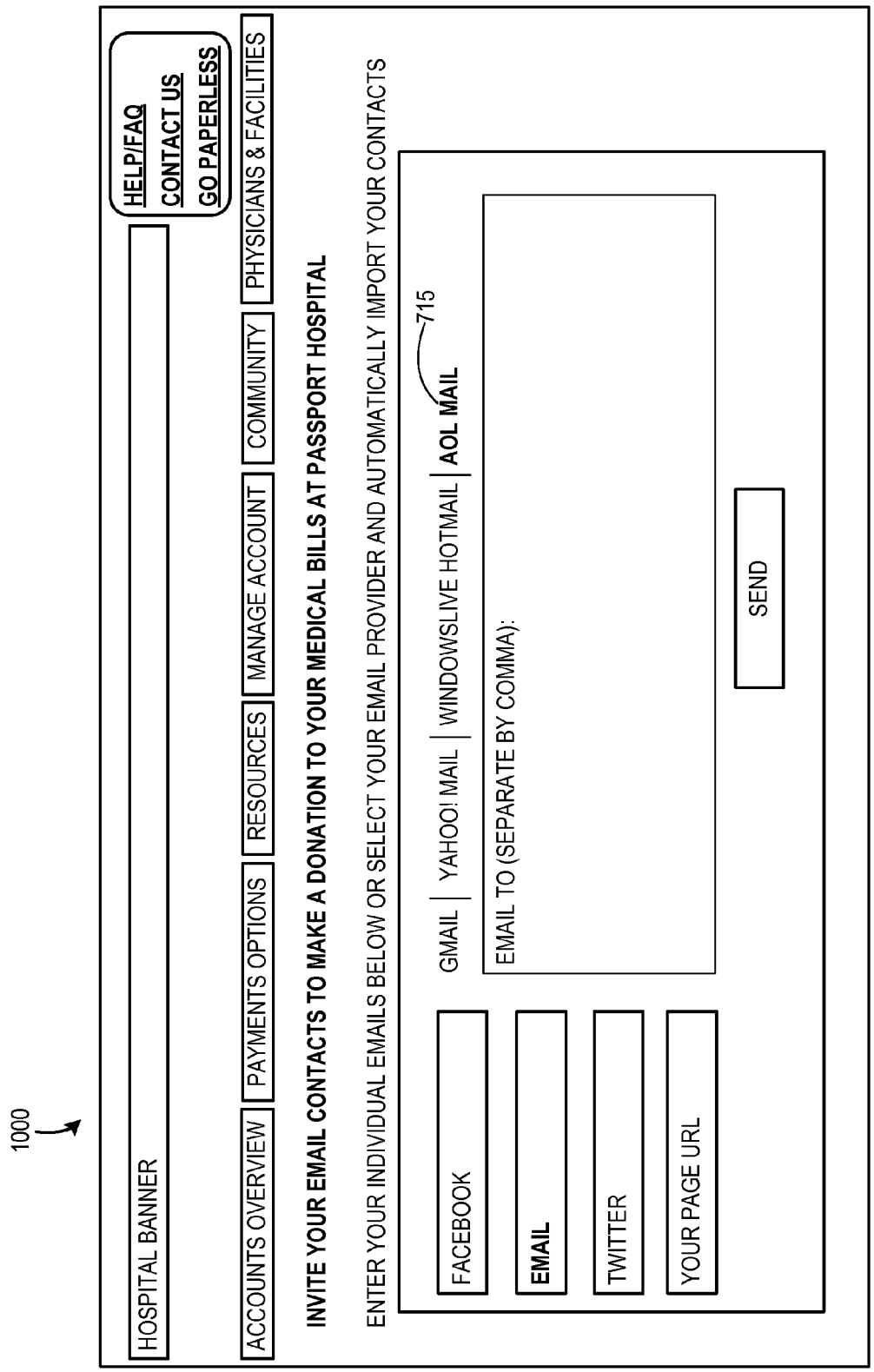
FIG. 10 is an illustration of a computer screen display showing an example of a graphical user interface screen for allowing a user to access his/her email accounts.
Figure 11:
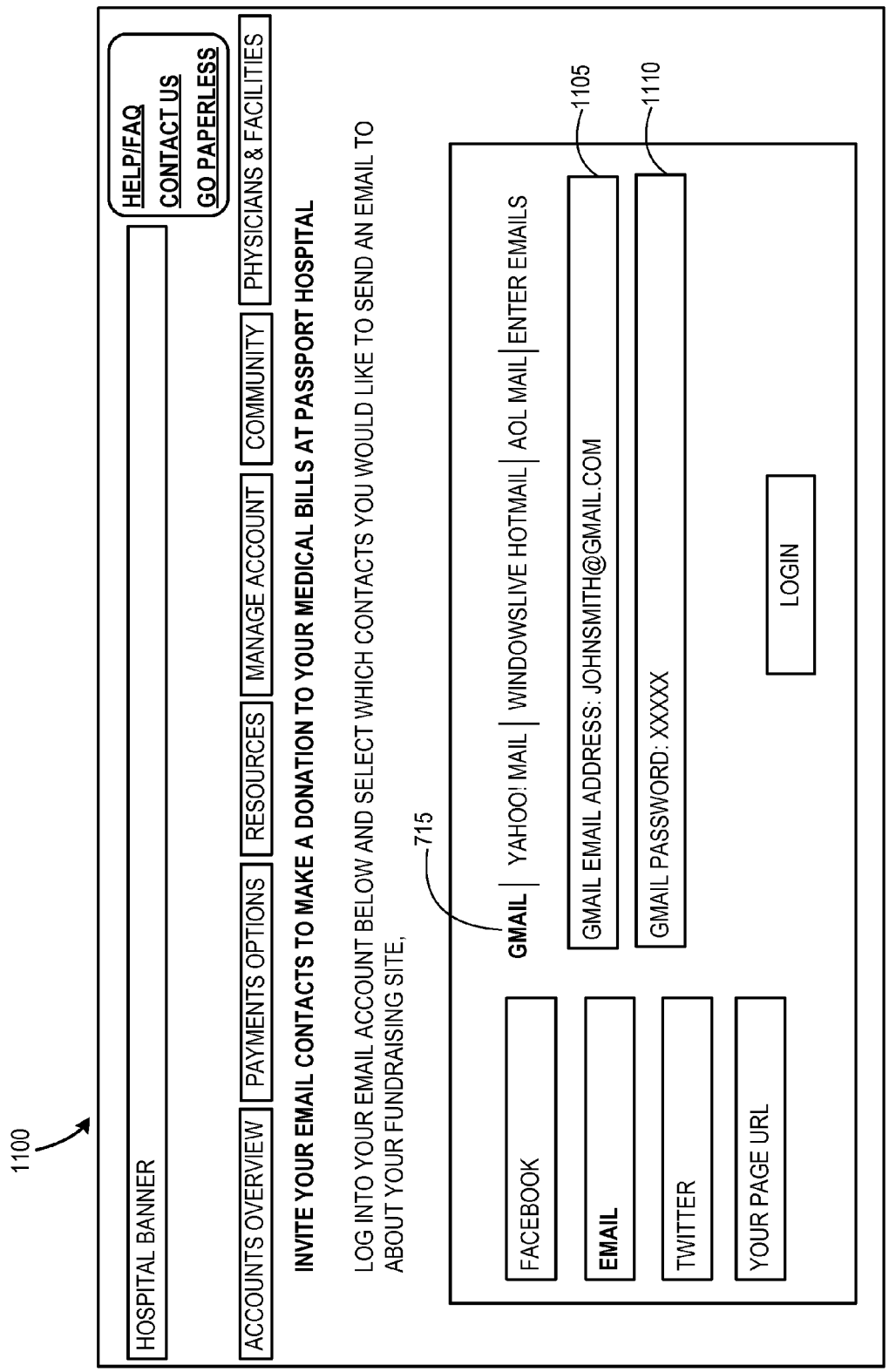
FIG. 11 is an illustration of a computer screen display showing an example of a graphical user interface screen for allowing a user to select one or more email providers associated with the user's email account(s).

As shown in FIG. 10, a user interface screen 1000 may be provided for allowing a user 102 to access his/her email account(s) 715 to import one or more contacts (i.e., third parties 125) associated with the email account(s). Email addresses of third parties 125 to which the user would like to email a notification of his/her fundraising webpage may also be manually input. Upon selection of an email provider, FIG. 11 shows an example of a user interface screen 1100 that may be provided for allowing a user to input his/her email address 1105 and password 1110 to log into his/her account 715 and begin a process of linking his/her email list to his/her fundraising webpage.

Figure 12:
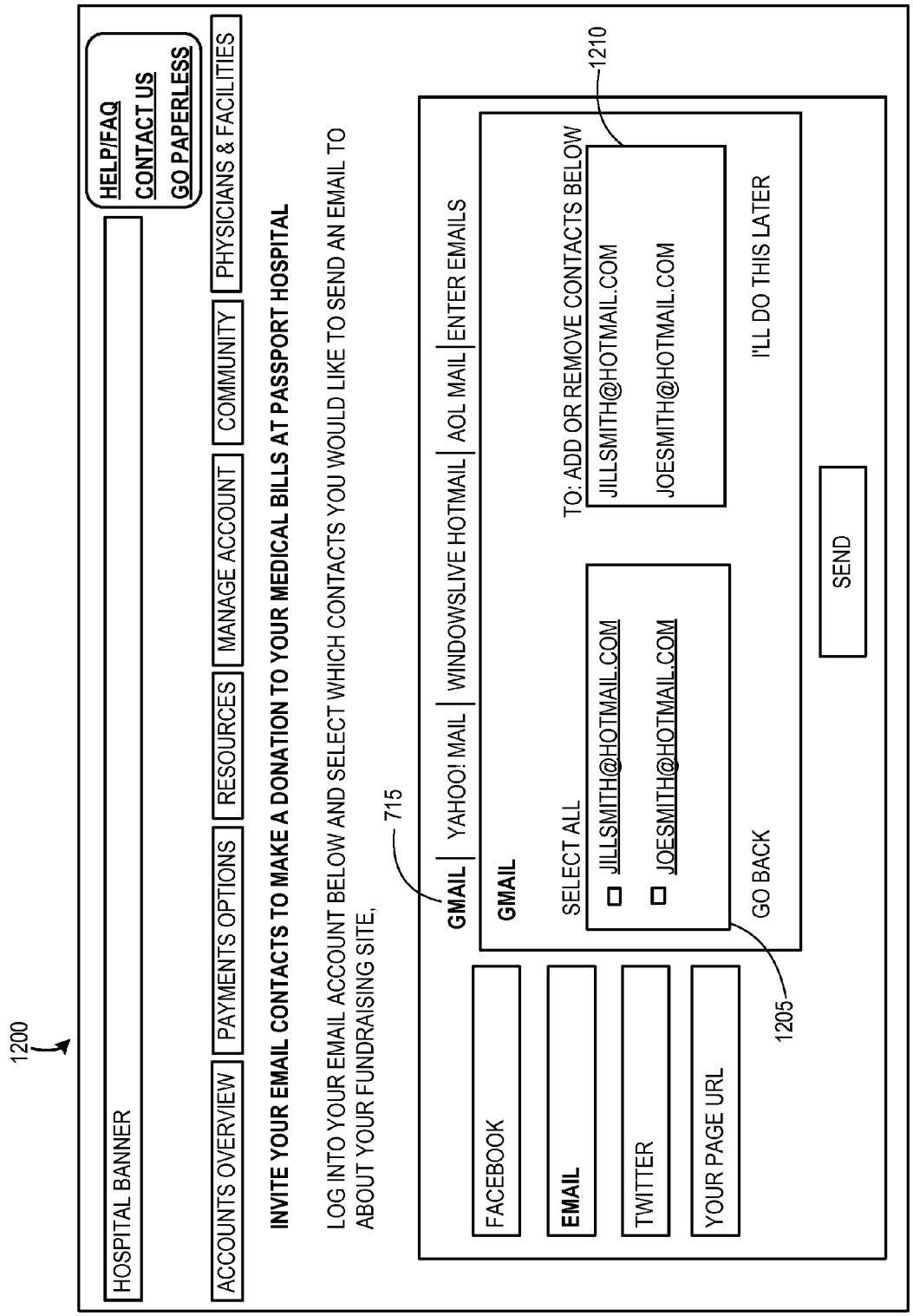
FIG. 12 is an illustration of a computer screen display showing an example of a graphical user interface screen for allowing a user to select contacts to whom to send an email to promote his/her fundraising webpage.

After logging into his/her email account 715, as shown in the example user interface screen 1200 in FIG. 12, the user's email list (e.g., contacts list) 1205 may be displayed, and one or more contacts (i.e., third parties 125) to whom the user would like to send an email to promote his/her fundraising webpage may be selected. For example and referring to the example user interface screen 1200, the user may select email addresses provided in his/her email list 1205, and add them to a fundraising webpage email distribution list 1210. The user may also remove email addresses from his/her list 1210 if he/she chooses not to send an email to his/her email contact. Once the user is finished adding or removing email addresses, he/she may select a "send" option to send an email. According to embodiments, an email template may be provided, which may be selected, copied, and pasted into an email body which the user may send through an email account. FIG. 13 shows an example of an email 1300 that may be sent to the fundraising webpage email distribution list 1210. As shown in the example email 1300, a link 605 to the user's fundraising webpage may be included.

Figure 14:
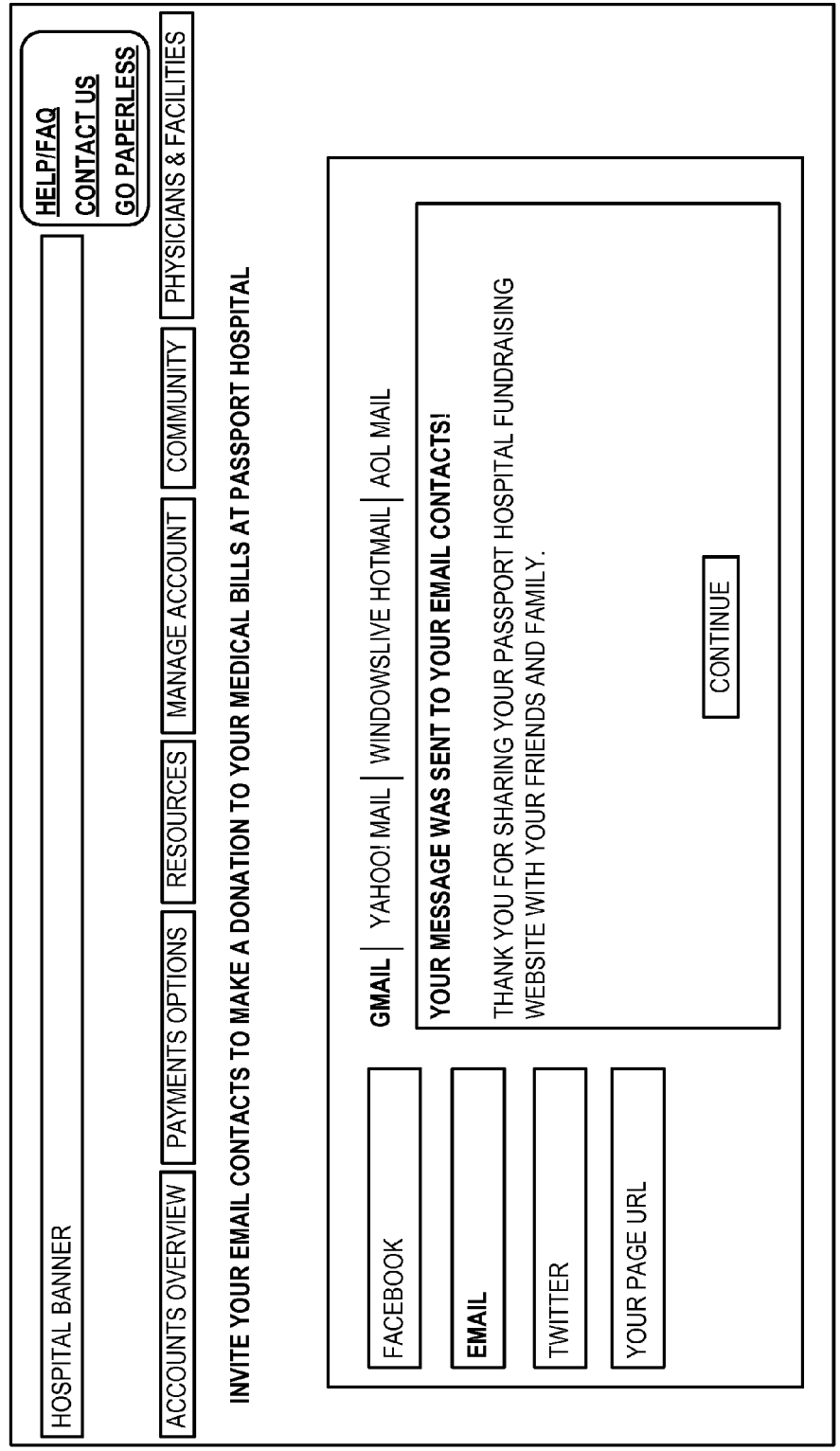
FIG. 14 is an illustration of a computer screen display showing an example of an email sent confirmation.
Figure 15:
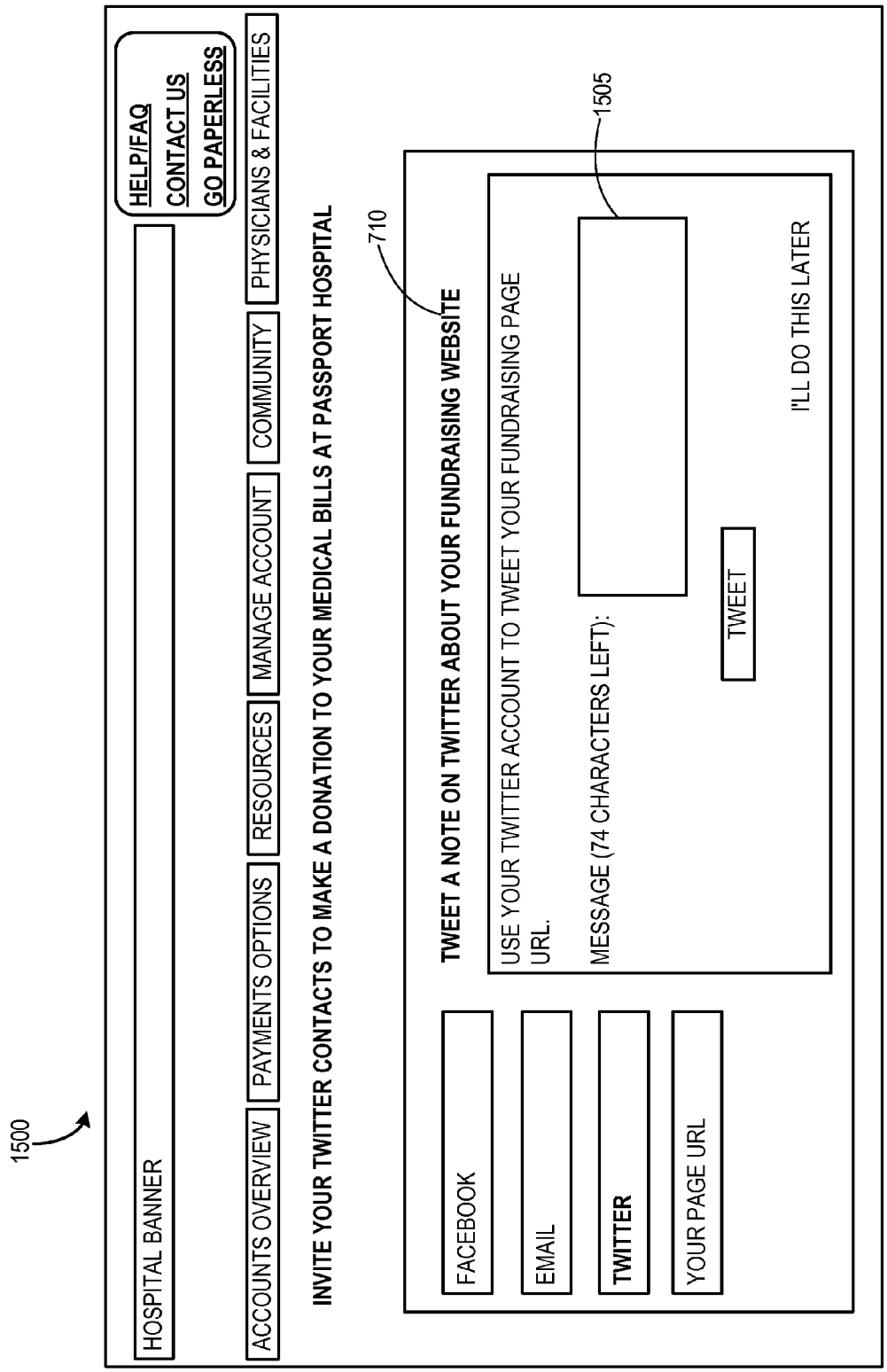
FIG. 15 is an illustration of a computer screen display showing an example of a graphical user interface screen for allowing a user to add a TWITTER account information and to tweet a message to his/her TWITTER list about his/her fundraising webpage.

As shown in FIG. 14, a confirmation 1400 may be displayed to the user 102 confirming that his/her email message was sent to the email contacts (i.e., third parties 125) 1210 whom he/she selected. As mentioned previously, embodiments of the present invention provide for allowing a user to connect his/her fundraising webpage to his/her social network web sites 705,710. FIG. 15 is an example user interface screen 1500 that may be utilized for allowing a user to add TWITTER account 710 information to TWEET a message to his/her TWITTER list about his/her fundraising webpage. The user interface screen 1500 may comprise a field 1505 wherein the user may enter the web address 605 for his/her fundraising webpage.

Figure 16:
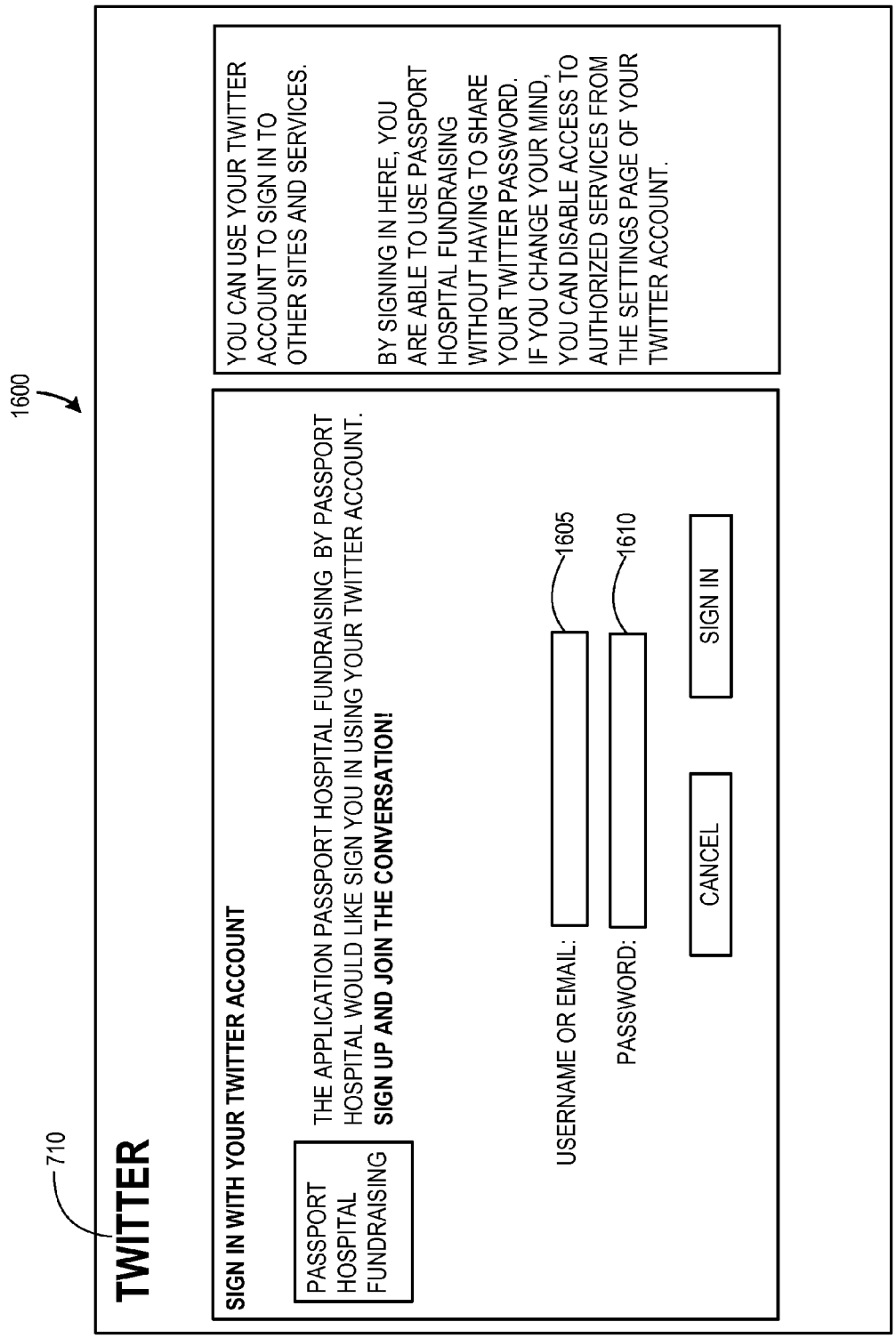
FIG. 16 is an illustration of a computer screen display showing an example of a TWITTER sign-in page.

As shown in FIG. 16, a social networking (e.g., TWITTER 710) sign in page may be displayed. As shown in the example sign in user interface screen 1600, fields may be provided for entering a username 1605 and password 1610 for the user's TWITTER account. Upon signing into the social networking (e.g., TWITTER 710) site, the user may allow or deny permission for the fundraising webpage that the user created to be linked with his/her TWITTER account and to allow or deny permission to show the web address 605 of the fundraising page in order to promote the fundraising page.

Figure 17:
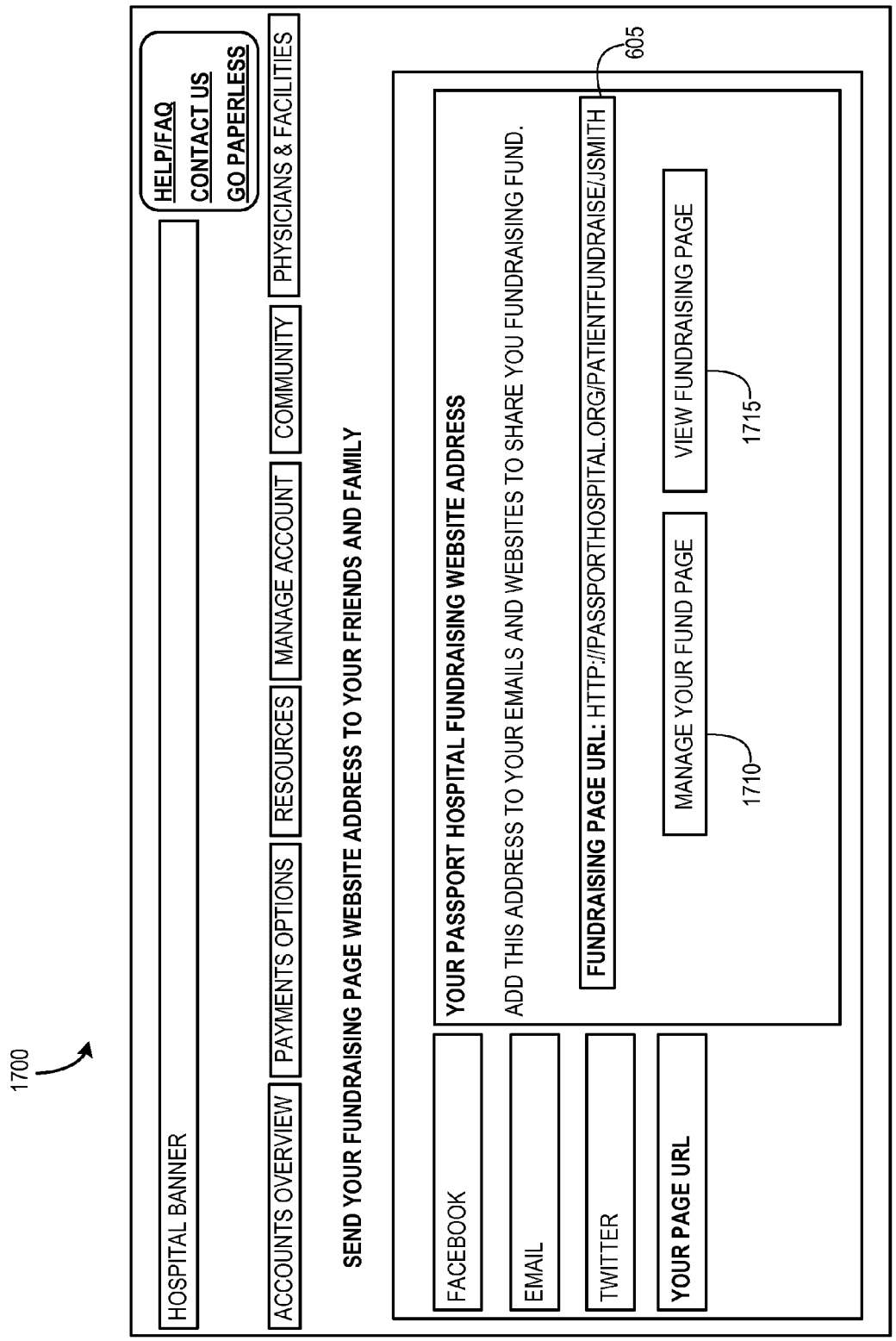
FIG. 17 is an illustration of a computer screen display showing an example of a graphical user interface screen for displaying a user's website address for his/her fundraising webpage.

As mentioned previously, a user 102 may share a fundraising webpage by posting a link to the fundraising webpage in emails and/or on any web site to which the user may have permission to post information. FIG. 17 shows an example user interface 1700 displaying the fundraising webpage address 605, which may be selected and copied into emails and on websites. As shown in the example user interface 1700, an option, such as a "Manage Your Fund Page" button 1710, may be provided for allowing the user to edit his/her fundraising webpage. Additionally, an option, such as a "View Fundraising Page" button 1715 may be provided for allowing the user to see his/her complete webpage.

Upon successfully setting up a fundraising webpage, the user may receive an email, such as the example email 1800 illustrated in FIG. 18. The email 1800 may include a link 605 to the user's fundraising webpage, the user's email address 620, and a listing of which billing account(s) 635 is/are active on the user's fundraising webpage.

Referring back to the flow diagram 200 in FIG. 2, after sharing the fundraising webpage with one or more third parties 125, at OPERATION 235, the one or more third parties may choose to access the fundraising webpage, wherein the webpage may be exposed to the one or more third parties. According to embodiments, billing information associated with one or more owed accounts may be exposed to the one or more third parties. Exposed billing information may include a fundraising goal amount, an amount owed by the user 102, and an amount donated by other third parties 125. A third party 125 may access the fundraising webpage via various means including, but not limited to, via selecting a link 605 to the user's fundraising webpage provided in an email 1800, published on a social networking site 705, 710, or published on another web site. A third party 125 may also access the fundraising webpage via manually entering the URL 605 for the fundraising webpage.

Referring now to FIG. 19, an example of a user interface of a user's fundraising webpage 1900 that is linked to the user's billing account(s) 635 is shown. As illustrated, the fundraising webpage 1900 may show an amount of the user's fundraising goal 1905 for each billing account 635. An amount the user has already raised 1910 may also be displayed. As illustrated, a selectable "donate" option 1915 may be provided for allowing a third party 125 to donate money to the user's billing account 635. The fundraising webpage 1900 may include a message section 630, which may include the user's personal story. A user's fundraising webpage 1900 may be edited and updated so that the user may share updated information with others. For example, text, photos, videos, etc., may be uploaded to the user's fundraising webpage. A recent donations/comments section 1920 may be provided for displaying donations made by one or more third parties 125. Messages left by a third party 125 may also be displayed in the recent donations/comments section 1920. A comment posting section 1925 may be provided for allowing a third party 125 to post a comment to the user's fundraising webpage 1900. Links 1930 may be provided for allowing a third party 125 to share the user's fundraising webpage 1900.

Referring again to FIG. 2, if a third party 125 selects a link 1930 to share the fundraising webpage 1900, the routine 200 may loop back to OPERATION 230, wherein a page, like the example page 700 in FIG. 7, may be provided for allowing the third party to link the page to his/her social networking account, to connect with his/her email list to create a fundraising webpage email distribution list, or to select and copy the fundraising webpage address 605 to paste into an email or other webpage.

The routine 200 proceeds to OPERATION 240, where a third party 125 selects to donate to the user's billing account 635. According to embodiments, a donation made by a third party 125 may be sent electronically to a billing accounts receivable system 115 for a specified owed billing account 635 on a fundraising webpage 1900. Upon selection of a "donate" option 1915, a user interface, like the example user interface 2000 illustrated in FIG. 20, may be provided. As shown in the example donation user interface page 200, various fields may be provided such as a field for entering a donation amount 2005, a field for entering the third party's name 2010, a field for entering the third party's email address 2015, and a field for posting a comment 2020. An option may be provided for allowing a third party 125 to make a private donation, wherein the third party's name may be kept private from the user 102 and other third parties. A selectable "donate" option 2025 may be provided. Upon selection of the selectable "donate" option, the third party 125 may be directed to an electronic payment system (e.g., PAYPAL, GOOGLE CHECKOUT, etc.) to complete the donation process.

Referring back to FIG. 2, upon confirmation by the electronic payment system, the routine 200 proceeds to OPERATION 245, where the donation amount may be applied to the user's billing account 635 in the billing accounts receivable system 115. A confirmation of the donation may be displayed, wherein the third party 125 may print the confirmation as a receipt. According to embodiments, a confirmation may automatically be emailed to the third party 125. According to one embodiment, received funds may be applied directly from the payment system 130 to the accounts receivable system 115. According to another embodiment, received funds may be applied from the payment system 130 to the accounts receivable system 115 via the intermediary system 120.

As shown in the example account dashboard 500 in FIGS. 21A and 21B, the user's billing account data may include amounts of donations 2105 made to a billing account 635. The billing account data 500 may show the updated account balance 2115 after the donation amount has been applied. A status alert 2110 may also be provided to alert the user that a donation has been made to an account 635. The routine ends at OPERATION 250.

According to embodiments, a fundraising webpage may be edited by a user. As shown in the example graphical user interface page 2200 in FIG. 22, a page may be provided for editing a page. The user may change the title 2205, photo 2210, personal story text 2215 and select which fields in a "Donations & Comments" section 2220 that he/she would like deleted from his/her fundraising webpage 1900.

Embodiments may provide for a graphical user interface screen that allows the user to review donations and comments that have been posted on his/her fundraising webpage 1900. An example summary page 2300 is shown in FIG. 23. The summary 2300 may show how much money has been donated for each owed billing account 635 and the amount remaining to pay off the account. The page may also include an area for displaying fundraising tips and ideas to the user 102.

Embodiments of the present invention may provide for a message to be provided to a user 102 when a new account 635 is added for which the user may owe a balance, or when an existing account 635 goes from zero to an owed balance. For example, if the user is a cancer patient, and his/she has a cancer drug that he/she is waiting for his/her insurance to pay, and if he/she finds out the insurance is not going to pay for it, the hospital may move the balance over into the patient's responsibility, wherein the patient now owes the amount for the drug. When the billing change occurs, a notification may be sent to the user 102 informing him/her that his/her account 635 qualifies to be added to his/her fundraising page 1900 because the patient balance went from zero to a owed amount.

Billing accounts 635 linked to a fundraising webpage 1900 may be managed by the user 102 As shown in FIG. 24, an example of a graphical user interface 2400 that allows the user to manage the billing accounts that are linked to his/her fundraising page is illustrated. The user may view any new billing accounts through the online billing office 105, may select which new accounts 635 he/she would like to add to his/her fundraising webpage 1900. Users may also be able to change his/her e-mail, view billing accounts that have been paid off, and remove an account from his/her site. Once he/she is done making changes, a "Save & Continue" button may be selected to save his/her changes.

Figure 25:
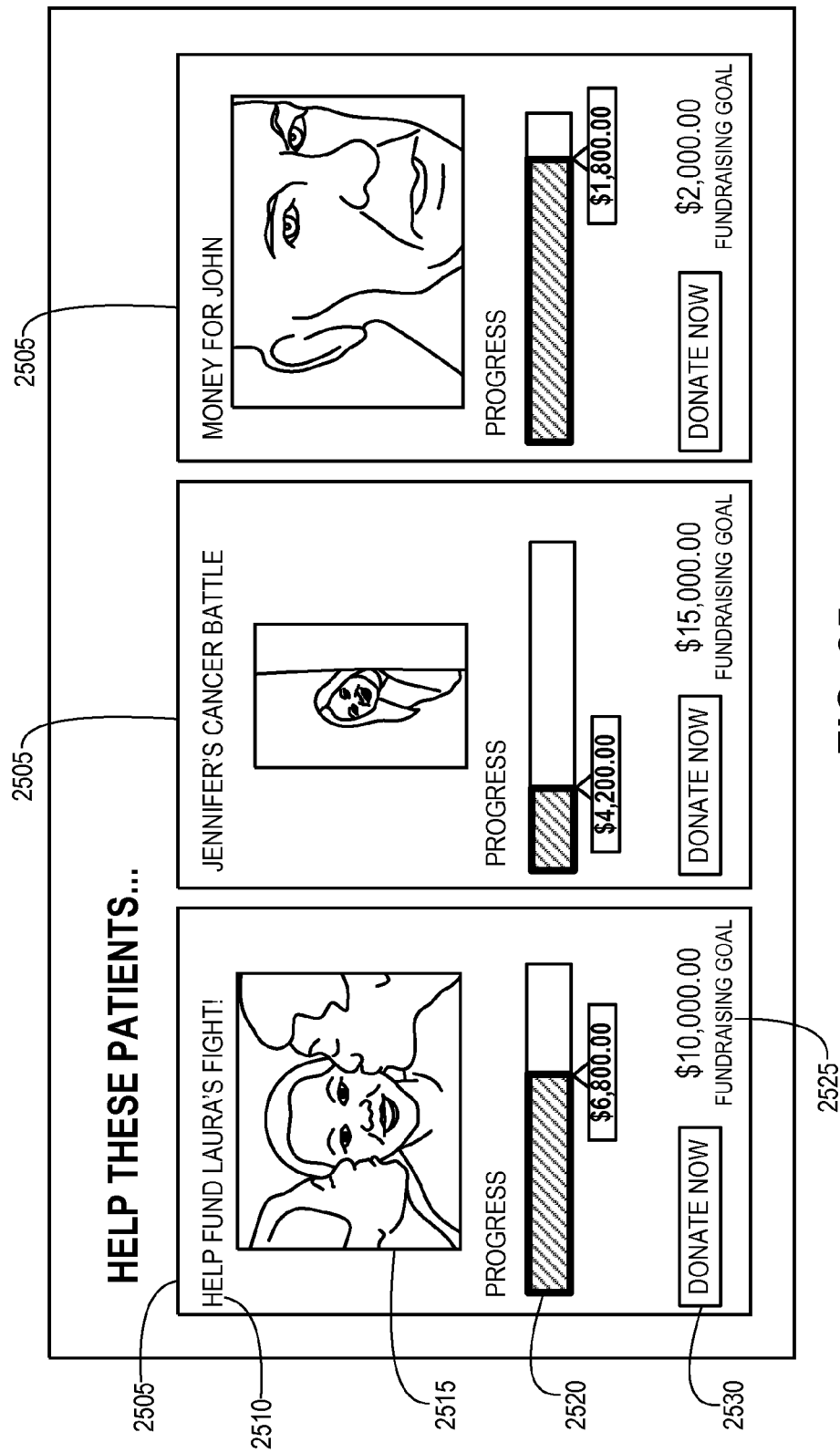
FIG. 25 is an illustration of a graphical user interface screen for providing access to users' personal fundraising webpages.

According to embodiments and as shown in FIG. 25, one or more highlights 2505 of users' fundraising webpages may be provided on a webpage associated with a business or organization (e.g., a healthcare provider, a college, university, or other educational system, a funeral home, a lender, etc.). Each fundraising webpage highlight 2505 may comprise a title 2510 associated with the individual user's fundraising webpage, a photo 2515 of the user 102, a user interface element 2520 showing the progress of donations to a fundraising goal amount 2525, and a selectable link 2530 for navigating to the selected user's fundraising webpage.

As described above, embodiments of the invention may be implemented via local and remote computing and data storage systems. That is, each of the systems and devices illustrated in FIG. 1 may be implemented as one or more local or remote memory storage and processing units. Such memory storage and processing units may be implemented in a computing device, such as computing device 2600 of FIG. 26. Any suitable combination of hardware, software, or firmware may be used to implement the memory storage and processing unit. For example, the memory storage and processing unit may be implemented with computing device 2600 or any other computing devices 2618, in combination with computing device 2600, wherein functionality may be brought together over a network in a distributed computing environment, for example, an intranet or the Internet, to perform the functions as described herein. Such systems, devices, and processors (as described herein) are examples and other systems, devices, and processors may comprise the aforementioned memory storage and processing unit, consistent with embodiments of the invention.

Figure 26:
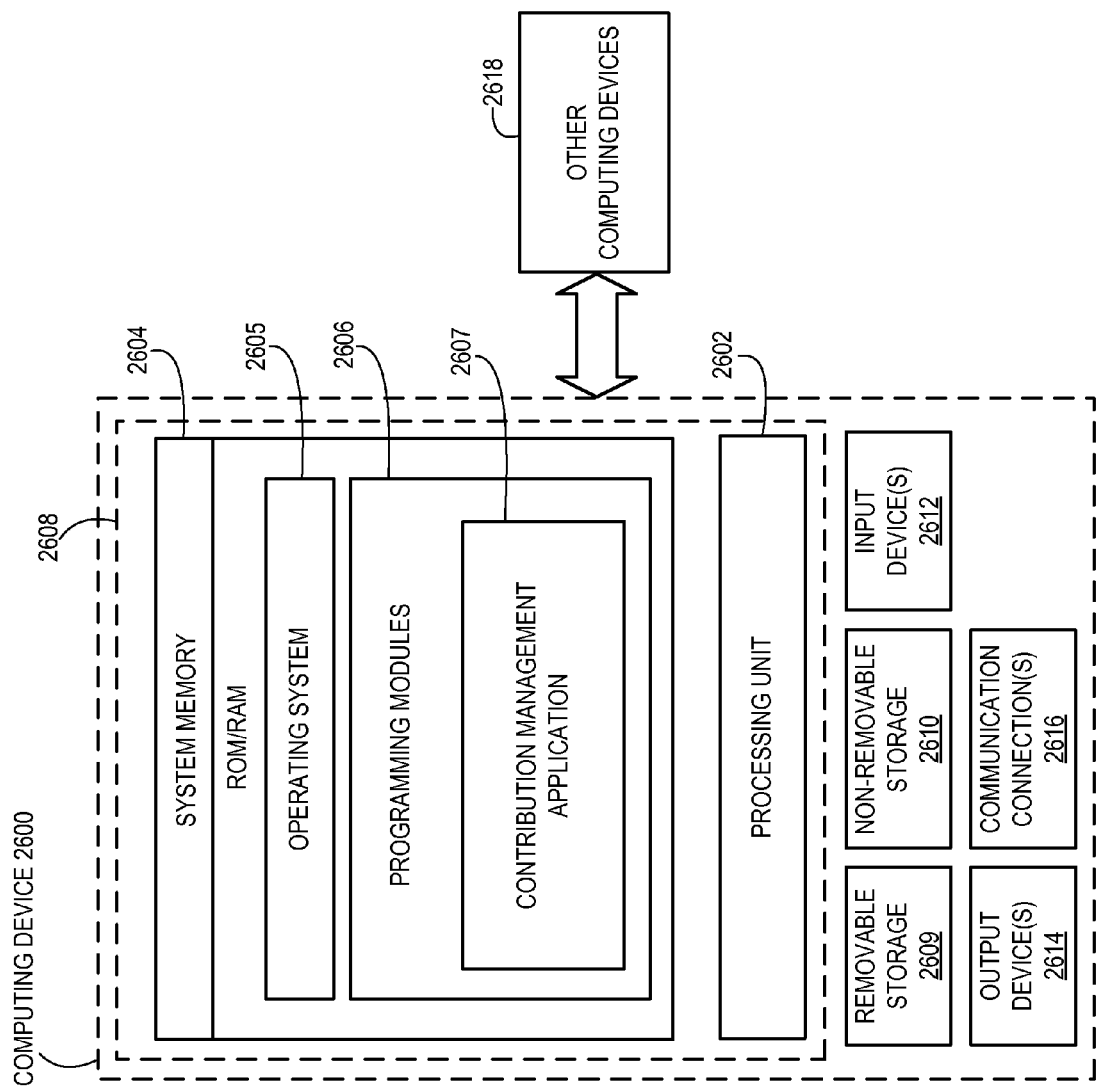
FIG. 26 is a simplified block diagram of a system including a computing device with which embodiments of the invention may be practiced.

With reference to FIG. 26, a system consistent with embodiments of the invention may include one or more computing devices, such as computing device 2600. The computing device 2600 may include at least one processing unit 2602 and a system memory 2604. The system memory 2604 may comprise, but is not limited to, volatile (e.g. random access memory (RAM)), non-volatile (e.g. read-only memory (ROM)), flash memory, or any combination. System memory 2604 may include operating system 2605, one or more programming modules 2606, and may include contribution management application 2607, wherein contribution management application is a software application having sufficient computer-executable instructions, which when executed, performs functionalities as described herein. Operating system 2605, for example, may be suitable for controlling computing device 2600's operation. Furthermore, embodiments of the invention may be practiced in conjunction with a graphics library, other operating systems, or any other application program and is not limited to any particular application or system. This basic configuration is illustrated in FIG. 26 by those components within a dashed line 2608.

Although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

The computing device 2600 may also include additional data storage devices (removable and/or non-removable) such as, for example, magnetic disks, optical disks, or tape. Such additional storage is illustrated in FIG. 26 by a removable storage 2609 and a non-removable storage 2610. Computing device 2600 may also have input device(s) 2612 such as a keyboard, a mouse, a pen, a sound input device, a touch input device, etc. Output device(s) 2614 such as a display, speakers, a printer, etc. may also be included. The aforementioned devices are examples and others may be used. Computing device 2600 may also contain a communication connection 2616 that may allow device 2600 to communicate with other computing devices 2618, such as over a network in a distributed computing environment, for example, an intranet or the Internet. Communication connection 2616 is one example of communication media.

Program modules, such as the contribution management application 2607, may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable user electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

Embodiments of the present invention, for example, are described above with reference to block diagrams and/or operational illustrations of methods, systems, and computer program products according to embodiments of the invention. For example, each of the FIGS. 1-26 and the described functions taking place with respect to each illustration may be considered steps in a process routine performed by one or more local or distributed computing systems. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

All rights including copyrights in the code included herein are vested in and the property of the Applicant. The Applicant retains and reserves all rights in the code included herein, and grants permission to reproduce the material only in connection with reproduction of the granted patent and for no other purpose.

I claim:

1. A method of exposing an accounts receivable account to a third party to allow the third party to interact with the accounts receivable account, comprising:
   receiving billing information from an accounts receivable system, wherein the billing information is associated with an owed account in the accounts receivable system;
   providing, via a webpage, an accounting of the owed account associated with a user owing funds to the accounts receivable system;
   providing, via the webpage, one or more fields for receiving funds in satisfaction of the owed account associated with the user owing funds to the accounts receivable system;
   exposing the webpage to one or more third parties;
   allowing the one or more third parties to access portions of the billing information and the owed account associated with the user; and
   receiving funds via the one or more fields from one of the one or more third parties via the webpage in satisfaction of the owed account.

2. The method of claim 1, further comprising applying the received funds to the owed account in the accounts receivable system.

3. The method of claim 1, wherein after receiving funds via the one or more fields from one of the one or more third parties via the webpage in satisfaction of the owed account, receiving updated billing information from the accounts receivable system, wherein the updated billing information is associated with the owed account in the accounts receivable system.

4. The method of claim 3, wherein after receiving updated billing information from the accounts receivable system, providing, via the webpage, an accounting of the updated owed account associated with the user owing funds to the accounts receivable system.

5. The method of claim 1, wherein exposing the webpage to the one or more third parties includes exposing the webpage via a distributed networked computing system.

6. The method of claim 1, wherein receiving funds via the one or more fields from one of the one or more third parties via the webpage in satisfaction of the owed account includes receiving an indication from the accounts receivable account of a receipt of funds from one of the one or more third parties.

7. The method of claim 1, wherein receiving funds via the one or more fields from one of the one or more third parties via the webpage in satisfaction of the owed account includes receiving an indication from an electronic payment system of a receipt of funds from one of the one or more third parties.

8. The method of claim 7, wherein receiving the indication from the electronic payment system includes receiving the indication from an online electronic payment service.

9. The method of claim 1, wherein receiving billing information from an accounts receivable system includes receiving an amount owed by the user to the accounts receivable system.

10. The method of claim 1, wherein receiving funds via the one or more fields from one of the one or more third parties via the webpage in satisfaction of the owed account includes receiving funds via the one or more fields from one of the one or more third parties via the webpage in partial satisfaction of the owed account.

11. The method of claim 1, wherein receiving funds via the one or more fields from one of the one or more third parties via the webpage in satisfaction of the owed account includes receiving funds via the one or more fields from one of the one or more third parties via the webpage in full satisfaction of the owed account.

12. The method of claim 1, further comprising allowing sharing of the webpage with the one or more third parties.

13. The method of claim 12, wherein allowing sharing of the webpage with the one or more third parties includes sharing a web address of the webpage via a connection of the webpage with a social networking website.

14. The method of claim 12, wherein allowing sharing of the webpage with the one or more third parties includes importing email addresses of one or more third parties from an email account and sharing a web address of the webpage via an email message to one or more of the imported email addresses.

15. The method of claim 1, wherein prior to exposing the webpage to the one or more third parties:
   receiving a request to publish the webpage;
   sending the webpage to an organization associated with the owed account for review; and
   upon receiving an indication of an approval, exposing the webpage to the one or more third parties.

16. A system for exposing an accounts receivable account to a third party to allow the third party to interact with the accounts receivable account, comprising:
   a processing unit; and
   a memory storage including instructions that, when executed by the processing unit, cause the system to:
      receive billing information from an accounts receivable system, wherein the billing information is associated with an owed account in the accounts receivable system;
      provide, via a webpage, an accounting of the owed account associated with a user owing funds to the accounts receivable system;
      provide, via the webpage, one or more fields for receiving funds in satisfaction of the owed account associated with the user owing funds to the accounts receivable system;
      expose the webpage to one or more third parties;
      allow the one or more third parties to access portions of the billing information and the owed account associated with the user; and
      receive funds via the one or more fields from one of the one or more third parties via the webpage in satisfaction of the owed account.

17. A computer readable medium containing computer executable instructions which when executed by a computer perform a method of exposing an accounts receivable account to a third party to allow the third party to interact with the accounts receivable account, comprising:
   receiving billing information from an accounts receivable system, wherein the billing information is associated with an owed account in the accounts receivable system;
   providing, via a webpage, an accounting of the owed account associated with a user owing funds to the accounts receivable system;

providing, via the webpage, one or more fields for receiving funds in satisfaction of the owed account associated with the user owing funds to the accounts receivable system;

exposing the webpage to one or more third parties;

allowing the one or more third parties to access portions of the billing information and the owed account associated with the user; and receiving funds via the one or more fields from one of the one or more third parties via the webpage in satisfaction of the owed account.

18. The computer readable medium of claim 17, further comprising applying the received funds to the owed account in the accounts receivable system.

19. The computer readable medium of claim 17, wherein after receiving funds via the one or more fields from one of the one or more third parties via the webpage in satisfaction of the owed account, receiving updated billing information from the accounts receivable system, wherein the updated billing information is associated with the owed account in the accounts receivable system.

20. The computer readable medium of claim 19, wherein after receiving updated billing information from the accounts receivable system, providing, via the webpage, an accounting of the updated owed account associated with the user owing funds to the accounts receivable system.

\* \* \* \* \*